(12) United States Patent
Matsumoto et al.

(10) Patent No.: US 7,729,804 B2
(45) Date of Patent: Jun. 1, 2010

(54) ROBOT CONTROLLER AND ROBOT CONTROL METHOD FOR SYNCHRONOUS OPERATION AND ADJUSTING ROBOT MOVEMENT BASED ON TWO MOVEMENT TIMES

(75) Inventors: Naoyuki Matsumoto, Mitsu-Gun (JP); Masatoshi Sano, Kakogawa (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 1047 days.

(21) Appl. No.: 11/384,316

(22) Filed: Mar. 21, 2006

(65) Prior Publication Data

US 2006/0217841 A1 Sep. 28, 2006

(30) Foreign Application Priority Data

Mar. 23, 2005 (JP) ............................. 2005-084497

(51) Int. Cl.
*G05B 19/418* (2006.01)
(52) U.S. Cl. ..................... 700/248; 700/245; 700/19
(58) Field of Classification Search ............... 700/245, 700/248
See application file for complete search history.

(56) References Cited

U.S. PATENT DOCUMENTS 4,891,765 A * 1/1990 Hatori et al. ................ 700/249
4,998,206 A * 3/1991 Jones et al. ................. 700/96
5,150,451 A * 9/1992 Deplano ..................... 700/248
5,254,923 A 10/1993 Kanitani
6,678,582 B2 * 1/2004 Waled ........................ 700/245
7,024,250 B2 * 4/2006 Graf et al. ................... 700/19
2004/0199290 A1* 10/2004 Stoddard et al. ............ 700/248

FOREIGN PATENT DOCUMENTS

| EP | 0 434 632 A2 | 6/1991 |
|----|--------------|--------|
| EP | 0 619 536 A1 | 10/1994 |
| EP | 1 004 408 A1 | 5/2000 |
| EP | 1 464 452 A2 | 10/2004 |
| EP | 1 468 791 A1 | 10/2004 |
| JP | A 07-271415 | 10/1995 |
| JP | A-9-101813 | 4/1997 |
| JP | A-2002-73127 | 3/2002 |
| JP | A-2003-25264 | 1/2003 |

* cited by examiner

*Primary Examiner*—Thomas G Black
*Assistant Examiner*—Sze-Hon Kong
(74) *Attorney, Agent, or Firm*—Oliff & Berridge, PLC

(57) ABSTRACT

A controller calculates first movement times when moving each robot hand from a movement start position to a synchronous operation position in a shortest time and decides the longest first movement time as a second movement time. The controller generates, for each robot, a robot operation plan for moving each robot hand without stopping from the movement start position to the synchronous operation position in the second movement time. The robot hand of each robot moves from the movement start position to the synchronous operation position without stopping and simultaneously reach the synchronous operation positions.

10 Claims, 19 Drawing Sheets

(1) MOVEMENT ROUTE OF FIRST ROBOT HAND (2) MOVEMENT ROUTE OF SECOND ROBOT HAND

ROBOT CONTROLLER AND ROBOT CONTROL METHOD FOR SYNCHRONOUS OPERATION AND ADJUSTING ROBOT MOVEMENT BASED ON TWO MOVEMENT TIMES

CROSS REFERENCE TO RELATED APPLICATIONS

This application is based upon the prior Japanese Patent Application No. 2005-84497 filed on Mar. 23, 2005, the entire contents of which are incorporated herein by reference.

BACKGROUND OF THE INVENTION

1. Field of the Invention

The present invention relates to a robot controller and a robot control method for moving each of standard moving parts of each of robots to each of synchronous operation positions respectively set and simultaneously performing operations of the robots.

2. Description of the Related Art

FIG. 23 is a drawing for explaining pressing equipment 6 of a related art. When two robots 1 and 2 are operated simultaneously and the operable ranges of the robots 1 and 2 are overlaid each other, it is necessary to prevent the robots 1 and 2 from mutual interference. As a related art, there is an art available for preventing interference using mutual communication of two robot controllers 3 and 4.

The pressing equipment 6 includes the first robot 1 for supplying a workpiece 8 before pressing to a pressing machine 7, the second robot 2 for collecting a pressed workpiece 9 from the pressing machine 7, the robot controllers 3 and 4 for respectively controlling the robots 1 and 2, and a programmable controller (abbreviated to PLC) 5 for giving an operation instruction to the robot controllers 3 and 4.

The first robot 1 holds the workpiece 8 from an unloading table 10 and arranges it at a pressing position p2 of the pressing machine 7. The second robot 2 collects the workpiece 9 arranged at the pressing position p2 of the pressing machine 7 and transfers it to the succeeding processing machine. Therefore, when the robots 1 and 2 are different in speed from each other, in the neighborhood of the pressing position p2 of the pressing machine 7 where the workpieces 8 and 9 are arranged, there is a fear of interference of the robots 1 and 2.

To prevent the robots 1 and 2 from interference, the first controller 3 stores information of a proximity position p1 on the upstream side of the pressing position p2 in the transfer direction. Further, the second controller 4 stores information of a separation position p3 on the downstream side of the pressing position p2 in the transfer direction. The first controller 3, on the basis of the information given from the second controller 4, judges whether the workpiece 8 can move into the neighboring space of the pressing machine 7 or not.

FIG. 24 includes graphs showing a change with time of the speed of each of the workpieces 8 and 9 of the robots 1 and 2. FIG. 24(1) shows a speed change of the robot hand of the first robot 1 and FIG. 24(2) shows a speed change of the robot hand of the second robot 2. As shown in FIG. 24(1), the first controller 3 stops the workpiece 8 before pressing at a point of time tp1 of arrival at the proximity position p1 where the workpiece 8 before pressing is moved. Further, as shown in FIG. 24(2), the second controller 24 moves the workpiece 9 after pressing at a point of time tp2 of arrival at the pressing position p2 where the workpiece 9 after pressing is held. And, the second controller 24 stops the workpiece 9 after pressing at a point of time tp3 of arrival at the separation position p3 where the workpiece 9 after pressing is moved.

And, at the point of time tp3 of arrival at the separation position, the second controller 4 transmits an arrival signal to the PLC 5. The PLC 5, upon receipt of the arrival signal from the second controller 4, gives a movement restart instruction to the controllers 3 and 4. The first controller 3, upon receipt of the arrival signal from the PLC 5, restarts the movement of the workpiece 8 before pressing from the proximity position p1 to the pressing position p2. Further, the second controller 4, upon receipt of the arrival signal from the PLC 5, restarts the movement of the workpiece 9 after pressing from the separation position p3 to the succeeding processing machine.

By such an operation, before the workpiece 9 after pressing is separated from the neighboring space of the pressing machine 7, the workpiece 8 before pressing is prevented from entrance into the neighboring space of the pressing machine 7. Therefore, the robots 1 and 2 can be prevented from interference with each other. This related art is disclosed, for example, in Japanese Patent Laid-Open Publication No. 7-271415.

In the related art aforementioned, the first robot 1 makes the workpiece 8 wait at the proximity position p1 at the proximity position arrival point of time tp1. And, after standby, when the workpiece 8 after pressing reaches the separation position arrival point of time tp3, the first robot 1 restarts the movement of the workpiece 8 before pressing. To prevent mutual interference of the robots 1 and 2, it is necessary to stop once them. The robots 1 and 2 are set to move as fast as possible to improve the production efficiency. In this case, even if the first robot 1 is moved at its maximum speed, if the workpiece 8 before pressing waits at the proximity position p1, compared with a case that the first robot 1 moves at a low speed and the workpiece 8 before pressing moves without stopping at the proximity position p1, the consumption of energy is increased and the energy efficiency is lowered.

Further, to prevent interference without keeping the workpiece 8 before pressing wait at the proximity position p1, it is considered to adjust manually the operation timing such as the robot speed so as to slow down the first robot 1. However, if the first robot 1 is excessively slowed down, even if the workpiece 9 after pressing reaches the separation position p3, a condition that the workpiece 8 before pressing does not reach yet the proximity position p1 is caused and a problem arises that the cycle time is increased.

Further, the timing adjustment by hand must be made whenever changing the equipment to be adjusted, workpiece shape held, movement posture, movement route, and movement position and cannot be decided uniformly. Therefore, a problem arises that the time required for preparation of the robot operation is increased. Further, also for the spot welding operation or painting operation by a plurality of robots, the similar problem is imposed.

SUMMARY OF THE INVENTION

Therefore, an object of the present invention is to provide a robot controller and a robot control method requiring no timing adjustment by hand for simultaneously performing synchronous operations of robots.

The present invention is a robot controller for moving each of standard moving parts installed on each of robots from each of movement start positions set for each of the robots to each of synchronous operation positions set for each of the robots and simultaneously performing operations of the robots, including: first movement time calculating means for calculating, for each of the robots, each of first movement times when moving each of the standard moving parts in a shortest time from each of the movement start positions to each of the synchronous operation positions; second movement time deciding means for deciding a longest first movement time among the first movement times calculated by the first movement time calculating means as a second movement time; operation plan generating means for generating, for each of the robots, an operation plan of speed change of each of the standard moving parts for moving each of the standard moving parts without stopping from each of the movement start positions to each of the synchronous operation positions in the second movement time decided by the second movement time deciding means; operation completion judging means for judging an operation completion condition in which the robot can execute a next operation plan; and robot controlling means, when judging by the operation completion judging means that all of robots to be simultaneously operated enter the operation completion condition, for simultaneously controlling each of the all of robots in accordance with each of next operation plans of each of the robots which is generated by the operation plan generating means.

Preferably, the first movement time calculating means, the second movement time deciding means, the operation plan generating means, the operation completion judging means, and the robot controlling means are provided for each of the robots. The robot controller further includes communicating means for giving each information of each first movement time calculated by each first movement time calculating means to each second movement time deciding means and giving each information indicating a shift to the operation completion condition judged by the operation completion judging means to each robot controlling means.

Preferably, the operation plan generating means is configured to be able to generate each synchronous operation plan for moving each of the standard moving parts from each of the movement start positions to each of the synchronous operation positions in the second movement time decided by the second movement time deciding means and each independent operation plan for moving each of the standard moving parts from a predetermined movement start position to a predetermined movement end position in the first movement time calculated by the first movement time calculating means.

Preferably, the robot controller further includes: operation instructing means for instructing an operation stop of the robots. The robot controlling means, when judging that the operation stop instruction is given to a target robot by the operation instructing means, stops an operation of other robot which is simultaneously operated with the target robot from the synchronous operation position.

Preferably, the robot controller further includes: operation instructing means for instructing an operation restart of the robots. The robot controlling means, when judging that the operation restart instruction is given to a target robot by the operation instructing means, restarts an operation of other robot which is simultaneously operated with the target robot from the synchronous operation position.

Preferably, the operation plan generating means, when the first movement time of a target robot is shorter than the second movement time, generates the operation plan of speed change of the standard moving part of the target robot so as to lower acceleration, deceleration, and maximum moving speed of the standard moving part in comparison to a case that the target robot moves in the first movement time.

Preferably, the first movement time includes an arrival time required for the standard moving part to move from the movement start position to the synchronous operation position and an expected time of an independent operation time required for an independent operation to be performed by the standard moving part at the synchronous operation position before performing an operation simultaneously with other standard moving part.

Preferably, the robot controller further includes inspecting means, when continuously performing synchronous operations of each of the robots several times during a predetermined synchronous period, for judging whether repetition times of execution of the synchronous operations of each of the robots which are taught beforehand are consistent with each other or not, and when judging that the repetition times of execution of the synchronous operations are not consistent with each other, for reporting that the repetition times of execution of the synchronous operations are not consistent with each other.

Preferably, the robot controller further includes checking means, when continuously performing synchronous operations of each of the robots several times during a predetermined synchronous period, for judging whether a target synchronous operation of a target robot and the synchronous operation of other robot to be performed simultaneously with the target synchronous operation have relevance to each other or not, and when judging that there is no relevance, for interrupting an control for the target synchronous operation of the target robot by the robot controlling means.

The present invention is a robot control method of moving each of standard moving parts installed on each of robots to each of synchronous operation positions set for each of the robots and simultaneously performing operations of the robots, including: a first movement time calculation step of calculating, for each of the robots, each of first movement times when moving each of standard moving parts in a shortest time from each of movement start positions to each of the synchronous operation positions; a second movement time decision step of deciding a longest first movement time among the first movement times calculated at the first movement time calculation step as a second movement time; an operation plan generation step of generating, for each of the robots, an operation plan of speed change of each of the standard moving parts for moving each of the standard moving parts without stopping from each of the movement start positions to each of the synchronous operation positions in the second movement time decided at the second movement time decision step; an operation completion judgment step of judging an operation completion condition in which the robot can execute a next operation plan; and a robot control step, when judging at the operation completion judgment step that all of robots to be simultaneously operated enter the operation completion condition, of simultaneously controlling each of the all of robots in accordance with each of next operation plans of each of the robots which is generated at the operation plan generation step.

According to the robot controller of the present invention, for the robots to perform the synchronous operations, the first movement times are calculated by the first movement time calculating means. Next, the longest movement time among the first movement times is decided as the second movement time by the second movement time deciding means.

The operation plan generating means generates an operation plan for each robot to move the standard moving part of each robot from the movement start position to the synchronous operation position without stopping in the second movement time. Next, when it is judged by the operation completion judging means that all the robots to be operated simultaneously enter the operation completion condition, the robot controlling means controls the robots in accordance with the next operation plans generated by the operation plan generating means. By doing this, the standard moving parts of the robots, when simultaneously starting movement from the movement start positions, move without stopping and reach simultaneously the synchronous operation positions. And, when the standard moving parts are moved to the synchronous operation positions, the operations of the robots are performed simultaneously.

As mentioned above, according to the present invention, the standard moving part of each robot is prevented from stopping during movement from the movement start position to the synchronous operation position. Therefore, even if the moving speed and movement distance are varied between the robots, there is no need to keep each standard moving part wait at the synchronous operation position. Therefore, the moving speed of each robot can be prevented from increasing unnecessarily, and the energy consumption can be reduced, and the energy efficiency can be improved. Further, the standard moving parts can be moved smoothly.

Furthermore, an operator does not need to adjust the moving speed and movement distance of each robot so as to simultaneously move the standard moving part of each robot to each synchronous operation position. Further, the operator, even if the movement start position and synchronous operation position are changed, does not need to adjust the moving speed and movement distance of each robot. Therefore, the time required for the preparation operation for performing the robot operation can be made shorter and the convenience can be improved. Further, according to the present invention, after all the robots to be operated simultaneously enter the operation completion condition, they start simultaneously the next operations, so that variations in the operation caused by variations in the robot control cycle and variations in the operation completion time of the welding operation can be prevented. Therefore, even if the operations to be performed simultaneously are performed continuously several times, variations in the operations of the robots are not accumulated and the synchronous operation of each robot can be performed stably.

Preferably, according to the present invention, the first movement time calculating means, second movement time deciding means, operation completion judging means, and operation plan generating means are respectively installed for each corresponding robot. The first movement time calculating means calculates the first movement time of the corresponding robot and gives the calculation results to each second movement time deciding means via the communicating means. Each second movement time deciding means obtains the information of the first movement time given from each first movement time deciding means via the communicating means and decides the second movement time from the first movement time obtained. Further, each robot controlling means obtains the information of the operation completion conditions given from each operation completion judging means via the communicating means and decides operation start timing.

As mentioned above, according to the present invention, each means aforementioned is installed for each robot, so that depending on an increase or a decrease in the robots, the corresponding means can be increased or decreased, thus each robot can perform the synchronous operation. For example, when adding one more robot, each means is added together with the robot, so that there is no need to change large the operation program indicating the control procedure of each means corresponding to the existing robots. Similarly, even when decreasing one robot, there is no need to change large the operation program indicating the control procedure of each means corresponding to the residual robots. Therefore, the robots can be easily increased or decreased.

Preferably, according to the present invention, when simultaneously operating a plurality of robots, the operation plan generating means generates a synchronous operation plan for the corresponding robot. Further, when operating independently a robot regardless of the other robots among the plurality of robots, the operation plan generating means generates an independent operation plan for the corresponding robot. As mentioned above, the operation plan generating means can generate an operation plan of the synchronous operation and independent operation of the robot.

As mentioned above, according to the present invention, among a series of operations of the robot, an operation of sequentially performing the independent operation and synchronous operation such as performing the synchronous operation by the robot after execution of the independent operation can be performed and the convenience can be improved.

Preferably, according to the present invention, the robot controlling means, when an operation stop instruction is given to the target robot from the operation-instructing means, stops the operations of the robots performing the synchronous operations. By doing this, the target robot is stopped, and the operations of the other robots can be stopped simultaneously, and the robots can be prevented from mutual interference. Therefore, the operator, when stopping one robot operation, does not need to separately perform a new operation to prevent mutual interference of the robots and can stop simultaneously the operations of the other robots performing the synchronous operations, thus the convenience can be improved.

Preferably, according to the present invention, the robot controlling means, when an operation restart instruction is given to the target robot from the operation instructing means, restarts the operations of the other robots performing the synchronous operations. By doing this, the target robot is restarted, and the operations of the other robots can be restarted simultaneously, and the robots can be prevented from mutual interference.

Therefore, the operator, when restating one robot operation, does not need to separately perform a new operation to prevent mutual interference of the robots and can restart simultaneously the operations of the other robots performing the synchronous operations, thus the convenience can be improved.

Preferably, according to the present invention, when the second movement time is longer than the first movement time, an operation plan is generated so as to lower the acceleration and deceleration of the standard moving part than those when it moves in the first movement time. By doing this, compared with the case that only the maximum moving speed during movement from the movement start position to the synchronous operation position is lowered, the energy consumption can be lowered furthermore.

Preferably, according to the present invention, the first movement time calculating means calculates the first movement time by adding the arrival time and the expected time of the independent operation time. The arrival time is a time required for the standard moving part to move to the synchronous operation position after starting movement from the movement start position. Further, the independent operation time is an expected time which will be required for an independent operation to be performed by the standard moving part at the synchronous operation position before performing the operation simultaneously with another standard moving part. By doing this, among the two robots to perform the synchronous operations, when one robot to perform the independent operation is supposed, the operation by the first and second robots can be started as soon as possible when the independent operations are finished and the increase in the cycle time due to the independent operations can be suppressed.

For example, when the first robot performing the independent operation and the second robot not performing the independent operation simultaneously perform the operations at the simultaneous operation positions and the first movement time of the second robot is longer than the first movement time of the first robot, at the time when the second robot reaches the simultaneous operation position, the independent operation of the first robot is completed. Therefore, the robots can simultaneously perform the operations at the simultaneous operation positions without waiting at the simultaneous operation positions. Further, the energy consumption of the first robot can be suppressed.

Further, for example, when the first robot performing the independent operation and the second robot not performing the independent operation simultaneously perform the operations at the simultaneous operation positions and the first movement time of the first robot is longer than the first movement time of the second robot, at the time when the first robot finishes the independent operation, the second robot reaches the simultaneous operation position. Therefore, the robots can simultaneously perform the operations at the simultaneous operation positions without waiting at the simultaneous operation positions. Further, the energy consumption of the second robot can be suppressed.

Preferably, according to the present invention, when the repetition times of execution of the synchronous operation by each robot to be synchronized are different during a predetermined synchronous period, the inspecting means reports that the repetition times of execution of the synchronous operation are not consistent with each other. Therefore, the operator can judge that any operation program of the robots is abnormal and before performing the synchronous operation of each robot, can correct the error of the operation program.

Preferably, according to the present invention, when the target synchronous operation of the target robot and the synchronous operation of another robot to be performed simultaneously with the concerned synchronous operation have no relevance during a predetermined synchronous period, the checking means interrupts the control for the target synchronous operation of the target robot by the robot controlling means. By doing this, among the synchronous operations of the robots, the synchronous operations having no relevance to each other can be prevented from being performed simultaneously and the robots can be prevented from execution of an undesired synchronous operation. For example, the relevance may be specified by the order of the synchronous operation after start of the synchronous period.

According to the robot control method of the present invention, for each robot to be operated simultaneously at the synchronous operation position, at the first movement time calculation step, the first movement time is calculated as a shortest time for the standard moving part of each robot to move from the movement start position to the synchronous operation position. Next, at the second movement time step, among the first movement times, the longest first movement time is decided as the second movement time.

When the second movement time is decided, at the operation plan generation step, an operation plan is generated for each robot so as to move the standard moving part of each robot in the second movement time without stopping from the movement start position to the synchronous operation position. Next, when it is judged at the operation completion decision step that all the robots to be operated simultaneously enter the operation completion condition, at the robot control step, each robot is controlled in accordance with next each operation plan generated at the operation plan generation step. By doing this, the standard moving parts of the robots, when simultaneously starting movement from the movement start positions, move to the synchronous operation positions without stopping and simultaneously reach the synchronous operation positions. And, when the standard moving parts move to the synchronous operation positions, the operations of the robots are performed simultaneously.

As mentioned above, according to the present invention, the standard moving parts of the robots can be prevented from stopping during movement from the movement start positions to the synchronous operation positions. Therefore, even if the moving speed and movement distance are varied between the robots, there is no need to keep each standard moving part waiting at the synchronous operation position. Therefore, the moving speed of each robot can be prevented from increasing unnecessarily, and the energy consumption can be reduced, and the energy efficiency can be improved. Further, the standard moving parts can be moved smoothly.

Furthermore, the operator does not need to adjust the moving speed and movement distance of each robot so as to simultaneously move the standard moving part of each robot to each synchronous operation position. Further, the operator, even if the movement start position and synchronous operation position are changed, does not need to adjust the moving speed and movement distance of each robot. Therefore, the time required for the preparation operation for performing the robot operation can be made shorter and the convenience can be improved. Further, according to the present invention, after all the robots to be operated simultaneously enter the operation completion condition, they start simultaneously the next operations, so that variations in the operation caused by variations in the robot control cycle and variations in the operation completion time of, e.g., welding operation can be prevented. Therefore, even if the operations to be performed simultaneously are performed continuously several times, variations in the operations of the robots are not accumulated and the synchronous operation of each robot can be performed stably.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
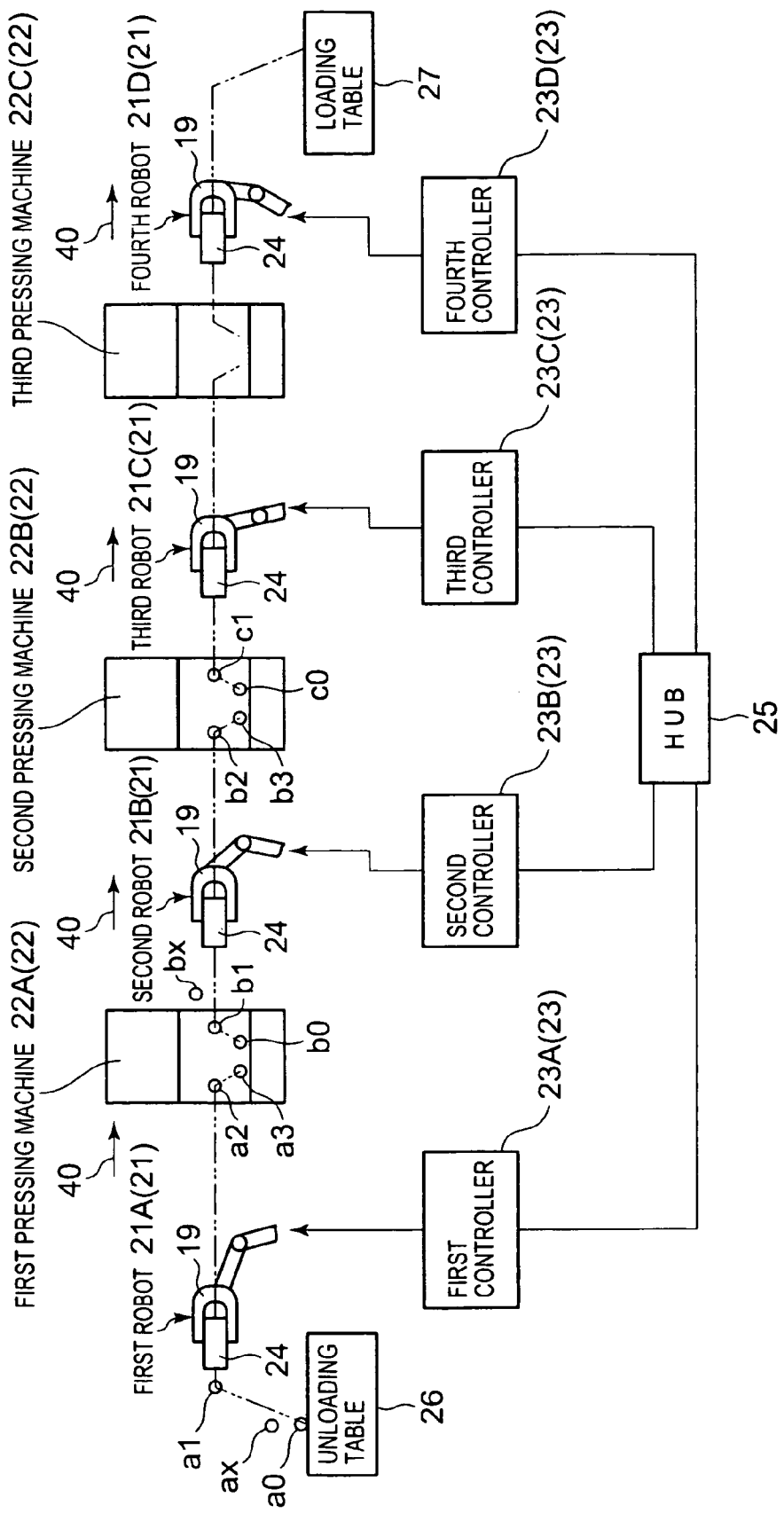
FIG. 1 is a block diagram showing a pressing equipment 20 of an embodiment of the present invention.

Referring to FIG. 1, the pressing equipment 20 is structured so as to include a plurality of pressing machines 22, a plurality of robots 21 for transferring a workpiece 24 between the pressing machines 22, a plurality of robot controllers 23 for controlling respectively the robots 21, and a hub 25 composing a communicating means for communicably connecting the robot controllers 23. In this embodiment, the pressing equipment 20 is equipped with three pressing machines 22A to 22C and four robots 21A to 21D.

Each robot 21 is a multi-axial robot and in this embodiment, is realized by a six-axial vertical multi-joint robot. The robot 21 is equipped with a rotational body on a base installed on the floor. On the rotational body, a plurality of arms are installed so as to change the angle around each axis. At the front end of the arm at the freest end, a wrist is installed. On the wrist, the robot hand 19 removably holding the workpiece 24 is installed. The robot hand 19 is a standard moving part installed on the robot 21.

Each robot 21 is equipped with a servo motor for each rotational axis of each arm. Each servo motor individually operates each arm. Each servo motor individually changes its angle and drives each arm to move, thus the robot hand 19 can move to an optional position with an optional posture.

Each robot 21 and each pressing machine 22 are arranged side by side in a transfer direction 40 of the workpiece 24. Further, the pressing machines 22 are arranged respectively between the robots 21. Concretely, a first pressing machine 22A is arranged between the first robot 21A and the second robot 21B. A second pressing machine 22B is arranged between the second robot 21B and a third robot 21C. A third pressing machine 22C is arranged between the third robot 21C and a fourth robot 21D. The workpiece 24, during transfer by each robot in the transfer direction 40, is pressed sequentially by the first to third pressing machines 22A to 22C.

The pressing machines 22A to 22C are set so as to obtain the same pressing timing. Namely, in the pressing machines 22A to 22C, the pressing period for bringing the top force and bottom tool close to each other and pressing a workpiece and the preparation period for separating the top force and bottom tool and collecting and supplying the workpiece coincide with each other. For example, each pressing machine 22 is structured so that power from one power source is transferred by a power transfer mechanism and the top force moves back and forth simultaneously with the bottom tool.

The first robot 21A holds one of a plurality of workpieces 24 prepared on an unloading table 26 and supplies the held workpiece 24 to the first pressing machine 22A. The second robot 21B holds the workpiece 24 pressed by the first pressing machine 22A and supplies the held workpiece 24 to the second pressing machine 22B. The third robot 21C holds the workpiece 24 pressed by the second pressing machine 22B and supplies the held workpiece 24 to the third pressing machine 22C. The fourth robot 21D holds the workpiece 24 pressed by the third pressing machine 22C and transfers the held workpiece 24 to a loading table 27.

Each robot 21, during the preparation period of separation of the top force and bottom tool of each pressing machine 22, collects the workpiece 24 from the unloading table 26 or the pressing machine 22 on the upstream side in the transfer direction and supplies the collected workpiece 24 to the loading table 27 or the pressing machine 22 on the downstream side in the transfer direction. When the process moves to the pressing period after workpiece supply and the top force and bottom tool of the pressing machine 22 approach each other, the workpiece 24 arranged on the pressing machine 22 is pressed. Next, when the process moves to the preparation period, the pressed workpiece 24 is arranged on the next pressing machine 22 or the loading table 27. The preparation period and pressing period are repeated like this, and the inter-pressing-machine transfer by the robots 21 is performed during the preparation period, thus the workpieces 24 pressed by the first to third pressing machines 22 are sequentially transferred to the loading table 27.

Each of the robot controllers (hereinafter, referred to as just controller) 23 is installed for each robot and is a robot controller for controlling the corresponding robots 21. The controller 23 is connected to the hub 25 by a LAN cable according to the Ethernet (registered trademark) standard. Therefore, the controllers 23 can communicate with each other. Here, "Ethernet" is a communication standard of LAN (local area network) standardized as IEEE802.3 and ISO8802-3 by Institute of Electrical and Electronic Engineers (abbreviated to IEEE) and International Organization for Standardization (abbreviated to ISO).

With respect to the first pressing machine 22A, during the preparation period of separation of the top force and bottom tool, the second robot 21B collects the workpiece 24 and the first robot 21A supplies the workpiece 24. Therefore, when the operation timing of the robot 21 is unsuitable, there is a fear that the first robot 21A and second robot 21B may interfere with each other in the neighborhood of the first pressing machine 22A. The same may be said with the second pressing machine 22B and third pressing machine 22C. In this embodiment, each controller 23 optimally sets the moving speed of the corresponding robot 21, thus the robots in the neighborhood of the pressing machine can be prevented from mutual interference.

Figure 2:
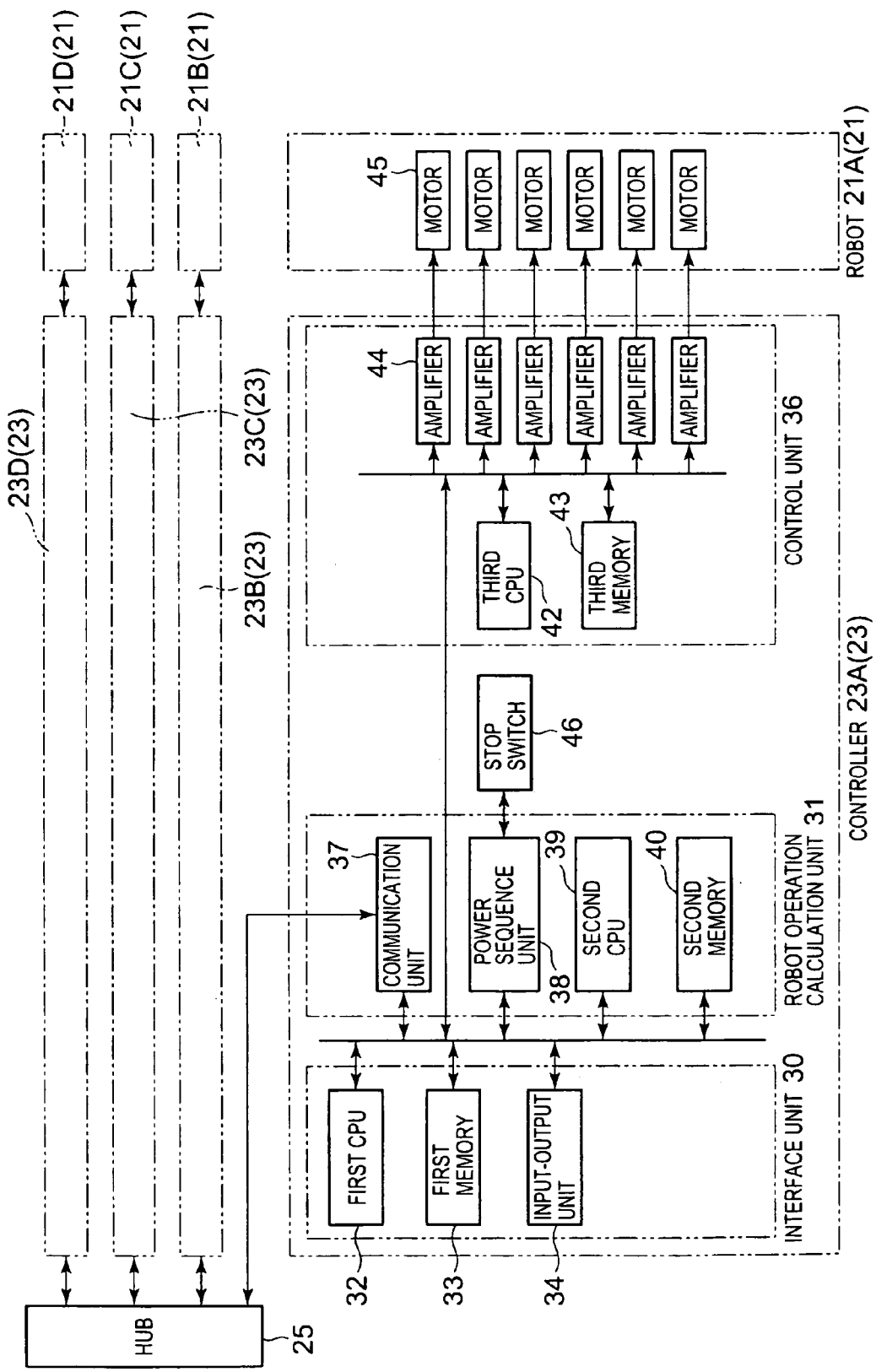
FIG. 2 is a block diagram showing the functional constitution of a controller 23.

Referring to FIG. 2, in this embodiment, the controllers 23 installed for each robot 21 have a similar constitution. Therefore, the first controller 23A will be explained and the explanation of the other controllers 23B to 23D will be omitted.

The controller 23 decides the operation amount of each servo motor of the robot 21 which is necessary to move the robot hand 19 in accordance with a program prestored. And, the operation amount is given to the servo motors, for example, as a current, thus the robot hand 19 can be moved on a predetermined movement route, at a predetermined moving speed, and in a predetermined movement posture.

The controller 23 includes an interface unit 30, a robot operation arithmetic unit 31, and a control unit 36. The interface unit 30 transfers information to an external device or an operator. The robot operation arithmetic unit 31 calculates the movement position to which the robot hand 19 moves every predetermined control time interval. Further, the control unit 36 supplies a current to servo motors 45 so as to move the robot hand 19 to the movement position every control time interval. Further, the components in the controller 23 are connected by a bus line so as to communicate mutually.

The interface unit 30 is structured so as to include a first CPU 32, a first memory 33, and an input-output unit 34. The input-output unit 34 performs an information input-output operation between the controller 23 and the external device or an information input-output operation between the controller 23 and the operator. In this embodiment, a teach pendant is connected to the input-output unit 34 by a cable. The teach pendant is an input unit for the operator to teach the operation position to the robot 21.

Further, the input-output unit 34 is structured so as to be connected to another external device in addition to the teach pendant, so that it can perform an information input-output operation between the controller 23 and the external device. As mentioned above, the controller 23 can obtain robot operation information from a device other than the teach pendant. Further, an operation unit and a display unit having the same function as that of the teach pendant may be installed in the frame unit of the controller 23.

The first CPU 32 controls the input-output operation of the input-output unit 34 and is realized, for example, by a central processing unit. The first memory 33 stores the operation program and robot operation information of the first CPU 32. Further, the first memory 33 stores calculation results given from the first CPU 32.

The first CPU 32 executes the operation program stored in the first memory 33, thereby decodes the robot operation information stored in the first memory 33, and generates a robot operation plan in accordance with the robot operation information. And, the first CPU 32 gives the generated robot operation plan to the robot operation arithmetic unit 31.

For example, the robot operation information is composed of movement route decision information necessary to decide the movement start position of the robot hand 19, movement end position, passing position, and movement route and information necessary to operate the robot such as the moving speed, opening and closing positions of the robot hand 19 and opening and closing instructions, and operation completion conditions under which the robot can execute the next operation plan. In this embodiment, the robot operation information includes a robot forward route operation program indicating the forward route operation of the robot hand 19 and a robot backward route operation program indicating the backward route operation.

The robot forward route operation program is an operation program of the robot hand 19 from collection of the workpiece 24 from the unloading table 26 or the pressing machine 21 on the upstream side in the transfer direction to supply of the collected workpiece 24 to the pressing machine 21 on the downstream side in the transfer direction or the loading table 27. Further, the robot backward route operation program is an operation program of the robot hand 19, after supply of the workpiece 24, of movement from the pressing machine 21 on the downstream side in the transfer direction to the pressing machine 21 on the upstream side in the transfer direction.

Further, the robot operation plan generated by the first CPU 32 is information that the robot operation program is decoded so as to be processed by a computer. In this embodiment, it includes the coordinates of the movement start position and movement end position, information indicating the movement route, and change with time of the moving speed of the robot hand 19.

The robot operation arithmetic unit 31 is structured so as to include a controller communication unit 37, a power sequence unit 38, a second CPU 39, and a second memory 40. The controller communication unit 37 is installed so as to communicate with communication units of the other controllers. The power sequence unit 38 stores and executes a robot operation program set independently of the robot operation plan such as the start procedure and end procedure of each of the servo motors 45.

The second CPU 39, when the robot operation plan is given from the first CPU 32, performs an interpolation process for the movement route and calculates a plurality of movement positions on the movement route where the robot hand 19 moves on the basis of the robot operation plan. Concretely, the second CPU 32 calculates the movement positions on the basis of the moving speed indicated in the robot operation plan, acceleration during acceleration and deceleration, and movement start position and movement end position. Here, the movement position is a position where the robot hand 19 sequentially moves every predetermined control time interval when moving the robot hand 19 along a predetermined movement route. In this embodiment, the movement position of the robot hand 19 is expressed by a simultaneous conversion matrix for indicating the position and posture of the robot hand 19. Further, the second CPU 39 performs reverse conversion calculations for the calculated movement positions of the robot hand 19 and obtains a target change position of each robot arm for moving the robot hand 19 to the target movement position. The second memory 40 stores the operation program of the second CPU 39 and stores operation results given from the second CPU 39.

The control unit 36 is structured so as to include a third CPU 42, a third memory 43, and amplifiers 44. The third memory 43 stores the operation program of the third CPU 42 and stores operation results given from the third CPU 42. Further, the third memory 43 sequentially stores the target change positions obtained by the second CPU 39 every control time interval.

The third CPU 42 sequentially reads the target change positions from the third memory 43 and decides an operation amount instruction value of each of the servo motors 45 for moving the robot arms to the target change positions. Concretely, the third CPU 42 obtains the detection change positions of the arms detected by encoders installed on the servo motors 45 and, on the basis of the target change positions and detection change positions, obtains the operation amount instruction values of the servo motors 45 under the feedback control.

As mentioned above, the third CPU 42 calculates the operation amount instruction values of the servo motors 45 every control time interval and gives the operation amount instruction values of the servo motors individually to the corresponding amplifiers 44. Each of the amplifiers 44, on the basis of the operation amount instruction value given from the third CPU 42, gives a current in accordance with the operation amount instruction value of each of the servo motors 45 to the corresponding servo motor 45. By doing this, each of the servo motors 45 moves the robot arm to the target change position calculated by the third CPU 42 and can move the robot hand 19 to the movement position. The movement position of the robot hand 19 is sequentially changed like this every control time interval, thus the robot hand 19 can be moved along the movement route.

In this embodiment, each of the controllers 23 moves the robot hand 19 from the movement start position set for each robot to the synchronous operation position and can perform simultaneously the operations of the robots. In this case, the first CPU 32 calculates the first movement time when moving the robot hand 19 from the movement start position to the synchronous operation position in the shortest time. Therefore, the first CPU 32 serves as a first movement calculating means for calculating the first movement time. The first CPU 32 gives the first movement time calculated to the second CPU 39.

The second CPU 39 gives the information of the first movement time calculated to the hub 25 via the controller communication unit 37. The hub 25 gives all the information of the first movement time given from the controllers 23A to 23D to the second CPU 39 of the controllers 23A to 23D via the controller communication unit 37. By doing this, the second CPU 39 can obtain all the information of the first movement time calculated for each robot.

The second CPU 39, among all the information of the first movement time obtained, decides the first movement time, which is a longest movement time, as second movement time. Therefore, the second CPU 39 serves as a second movement deciding means for deciding the second movement time. The second CPU 39 generates an operation plan of speed change of the robot hand 19 for taking the second movement time without stopping and moving the robot hand 19 from the movement start position to the synchronous operation position. Therefore, the second CPU 39 performs the calculation for correcting the operation plan given from the first CPU 32.

In this way, the second CPU 39 generates a robot operation plan in accordance with the second movement time.

Further, the second CPU 39, when judging that predetermined operation completion conditions for the robot to be controlled are satisfied, judges an operation completion state in which the robot can execute the next operation plan.

In this embodiment, the conditions of (1) the robot hand 19 reaches the corresponding synchronous position, (2) the calculation of the operation plan in the next operation of the robot hand 19 is completed, and (3) the standby condition such as signal standby of the robot hand 19 is released are all satisfied. Further, these operation completion conditions are an example and other conditions may be used.

The second CPU 39, when judging that the target robot finishes the current operation and enters the operation completion state, gives the information indicating that the target robot enters the operation completion state to the hub 25 via the controller communication unit 37. The hub 25 gives all the information of the operation completion state given from the controllers 23A to 23D to the second CPU 39 of each of the controllers 23A to 23D via the controller communication unit 37. By doing this, the second CPUs 39 can obtain all the information of the operation completion state judged for each robot.

When the target robot performs the synchronous operation with a plurality of robots, the second CPU 39 executes the next operation plan when judging that all the robots to perform the synchronous operation enter the operation completion state. Further, when the target robot performs the independent operation, the second CPU 39 executes the next operation plan when judging that the target robot enters the operation completion state.

The second CPU 39, when executing the next operation plan, performs the interpolation process for the movement route and calculates a plurality of movement positions on the movement route where the robot hand 19 moves on the basis of the operation plan next to it. And, the second CPU 39 gives sequentially the calculated movement positions to the third CPU 42. The third CPU 42 decides the operation amount instruction value of each of the servo motors 45 so as to move the robot hand 19 to the given movement positions and controls the servo motor 45. By doing this, the robot operation arithmetic unit 31 and control unit 36 become a robot controlling means for controlling the robots.

Further, in this embodiment, the controller 23 is equipped with a stop switch 46 for instructing operation stop of the robot. The stop switch 46 gives a stop signal to the power sequence unit 38 when confirming an input of the stop instruction of the robot by information given from an operator or each sensor. The power sequence unit 38 executes the stop operation for stopping the robot upon receipt of the stop signal. Further, the power sequence unit 38 gives the stop signal to other controllers 23 via the controller communication unit 37 and hub 25. And, each of the controllers 23 stops the operation of the robot when the stop signal is given from the controller for controlling the robot to perform the synchronous operation for the robot controlled by itself.

For example, the stop switch 46 may be an abnormal state detecting means for detecting an abnormal state of the robot. In this case, the stop switch 46, when confirming an error of the robot from information given from the operator or each sensor, gives a stop signal to the power sequence unit 38.

Further, the input-output unit 34, when confirming an input of a restart instruction of the robot from the information given from the operator or each sensor, gives a restart signal to the power sequence unit 38. The power sequence unit 38 gives the restart signal to the other controllers 23 via the controller communication unit 37 and hub 25. And, each of the controllers 23 restarts the robot operation when the restart signal is given from the controller controlling the robot to perform the synchronous operation for the robot controlled by itself. For example, when the restart signal indicating that the abnormal state is canceled is given from the input-output unit 34 by the operator, each robot restarts the operation so as to continue the operation before stop. Therefore, the stop switch 46 and input-output unit 34 become an operation instructing means for instructing operation stop and operation restart of the robot.

Figure 3:
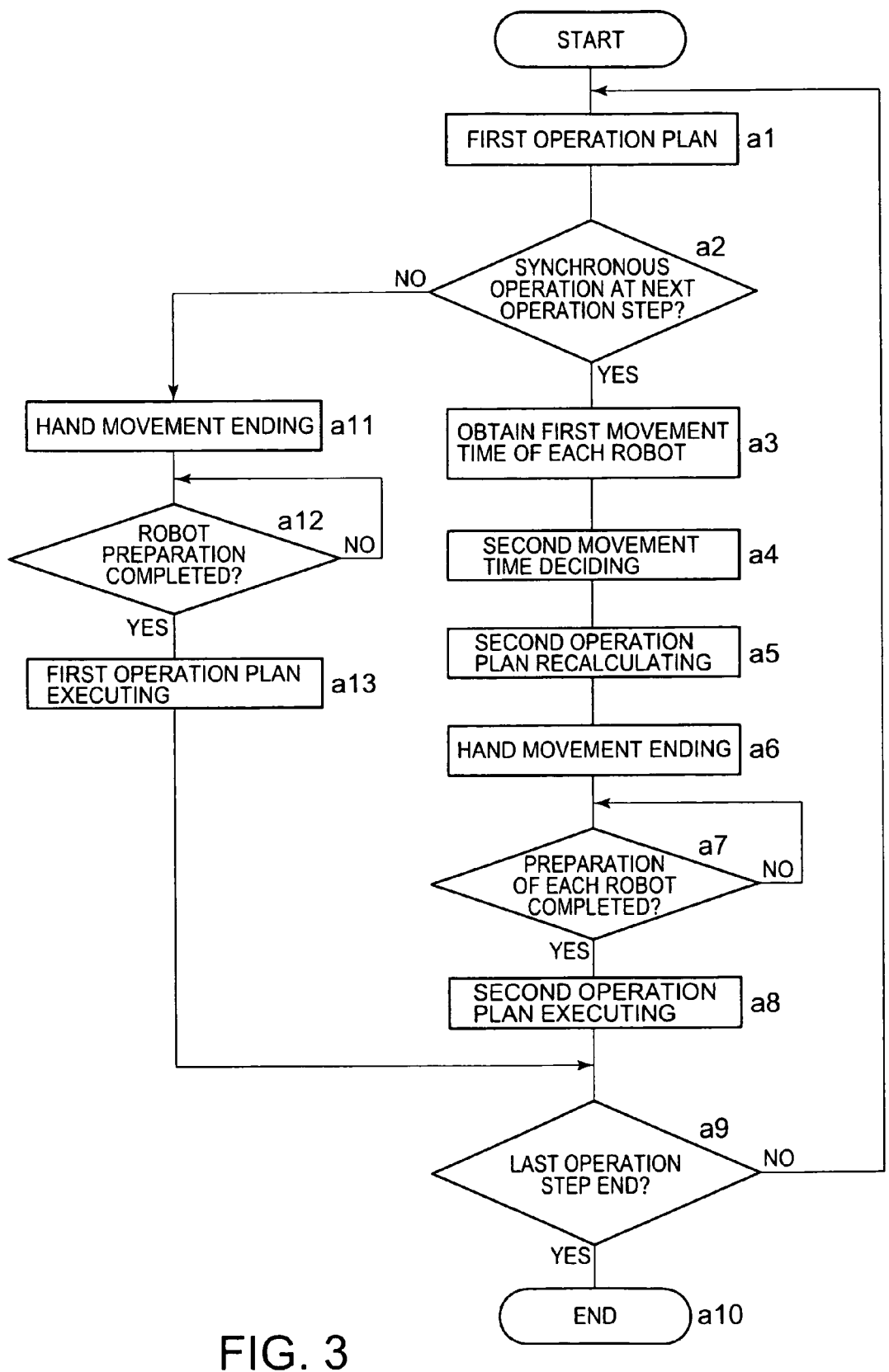
FIG. 3 is a flow chart showing a robot control procedure by the controller 23.

FIG. 3 is a flow chart showing the robot control procedure by the controller 23. When the forward route operation program indicating information of a plurality of teaching positions arranged along the movement route of the robot hand 19, speed setting of the robot hand, acceleration setting, opening and closing positions of the robot hand, and operation completion conditions is stored in the first memory 33, if the operation start instruction of the robot hand 19 is given to the input-output unit 34 from the operator or external device, the controller 24 goes to Step al and starts the robot control operation. Here, the plurality of teaching positions include the movement start position of the robot hand 19, first to "m"th passing positions, and movement end position. The forward route operation program is a program in which a plurality of operation steps to be performed when the robot performs the forward route operation are described in the order of operation.

At Step a1, the first CPU 32 reads the operation step to which the robot hand 19 moves next from the first memory 33. And, the first CPU 32, from the teaching positions, extracts the movement start position and movement end position at the target operation step and calculates the first operation plan including the speed change of the robot hand 19 moving at its minimum between the concerned positions and the first movement time which is a shortest time required for movement. And, the first CPU 32 stores the calculated first operation plan in the first memory 33 and goes to Step a2. As mentioned above, at Step a1, the first CPU 32 calculates the first operation plan at the operation step just behind the operation step operated by the robot 21 at the present time. And, the first CPU 32 gives the calculated operation plan to the second CPU 39.

For example, when the robot hand 19 is before movement start, the first CPU 32 obtains the first operation plan from the movement start position to the first passing position and stores it in the first memory 33. Further, when the robot hand 19 is passing from the "n−1"th passing position to the "n"th passing position, the first CPU 32 obtains the first operation plan from the "n"th passing position to the "n+1"th passing position and stores it in the first memory 33. Further, when the robot hand 19 is passing from the "m−1"th passing position to the "m"th passing position, the first CPU 32 obtains the first operation plan from the "m"th passing position to the movement end position and stores it in the first memory 33. Here, "n" and "m" indicate natural numbers.

At Step a2, the first CPU 32 judges whether at the operation step just behind the operation step operated by the robot 21 at the present time, it is set to perform the synchronous operation with another robot or not. When judging that it is set to perform the synchronous operation, the first CPU 32 goes to Step a3 and when it is not set, the first CPU 32 goes to Step a11.

At Step a3, the second CPU 39, among the first operation plan calculated at Step a1, transmits the information of the first movement time to the second CPU 39 of another controller 23 via the LAN cable and hub 25. Further, the second CPU 39 receives the information of the first movement time among the first operation plan of another robot given from the second CPU 39 of another controller 23. In this way, when each of the controllers 23 for controlling each robot to be synchronized obtains the information of each first movement time for each robot to be synchronized, it goes to Step a4.

At Step a4, the second CPU 39, among the information of each first movement time obtained at Step a3, decides the longest second movement time and goes to Step a5. At Step a5, the second CPU 39, in place of the first operation plan calculated at Step a1, recalculates the second operation plan for spending the second movement time decided at Step a4 and moving each robot hand 19 from the movement start position to the movement end position without stopping and goes to Step a6.

At Step a6, the second CPU 39, when judging that the robot hand 19 of each of the robots 21 to perform the synchronous operation reaches the synchronous operation position in the operation plan recalculated at Step a5 and the target robot enters the operation completion state, transmits information indicating a shift to the operation completion state to the second CPU 39 of another controller 23 via the LAN cable and hub 25 and goes to Step a7.

At Step a7, the second CPU 39 receives the information of the operation completion state of another robot judged by the second CPU 39 of another controller 23. And, the second CPU 39, when judging that the preparation of each robot to perform the synchronous operation is completed and the target robot enters the operation completion state, goes to Step a8. In this embodiment, the second CPU 39, when judging at Step a7 that the conditions of (1) each robot hand to be synchronized reaches the corresponding synchronous position, (2) the calculation of the operation plan at the next operation step of all the robot hands to be synchronized is completed, and (3) the standby condition such as signal standby of all the robot hands to be synchronized is released are all satisfied, goes to Step a8.

At Step a8, the second CPU 39 performs interpolation calculations for the movement positions in accordance with the second operation plan and gives the calculation results to the third CPU 42. The third CPU 42 gives a current instruction value of the servo motors in accordance with the second operation plan to the servo amplifiers. Therefore, the robot 21 is operated so as to follow the second operation plan. The second CPU 39 gives the calculation results of interpolation calculations of the movement positions in accordance with the second operation plan recalculated at Step a5 sequentially to the third CPU 42. The third CPU 42 gives the current instruction value of the servo motors in accordance with the second operation plan to the servo amplifiers. Therefore, the robot 21 is operated so as to follow the second operation plan. As mentioned above, the second CPU 39, when giving the calculation results to the third CPU 42, goes to Step a9.

At Step a9, the first CPU 32 judges whether, among the operation steps included in the forward route operation program, the operation plan relating the last operation step is given to the second CPU 39 or not and when judging that it is not given, returns to Step a1. When judging that it is given, the first CPU 32 goes to Step a10 and finishes the operation.

Further, at Step a2, the first CPU 32, when judging that at the operation step just behind the operation step performed by the robot 21 at the present time, it is not set to perform the synchronous operation with another robot, goes to Step a11. At Step a11, the second CPU 39, when judging that the robot hand 19 reaches the operation target position in the first operation plan calculated at Step a1 and the target robot enters the operation completion state, transmits information indicating a shift to the operation completion state to the second CPU 39 of another controller 23 via the LAN cable and hub 25 and goes to Step a712.

At Step a12, the second CPU 39 judges that the preparation of the target robot is completed and the robot enters the operation completion state and goes to Step a13. In this embodiment, the second CPU 39, at Step a12, when the conditions of (1) the self robot hand reaches the corresponding synchronous position, (2) the calculation of the operation plan at the next operation step of the self robot hand is completed, and (3) the standby condition such as signal standby of the self robot hand is released are all satisfied and the preparation of the self robot is completed, goes to Step a13.

At Step a13, the second CPU 39 gives the calculation results of the interpolation calculation performed for the movement positions in accordance with the first operation plan calculated at Step a1 to the third CPU 42. The third CPU 42 gives a current instruction value of the servo motors in accordance with the first operation plan to the servo amplifiers. Therefore, the robot 21 is operated so as to follow the first operation plan. As mentioned above, the second CPU 39, when giving the calculation results to the third CPU 42, goes to Step a9.

When the first CPU 32, second CPU 39, and third CPU 42 are operated like this, the robot hands 19 can reach the synchronous operation position at the same time. In other words, the second CPU 39 recalculates the operation plan at Step a5, thus the robot hands 19 reach the synchronous position at the same time, so that the operator does not need to manually adjust the timing of each robot.

Figure 4:
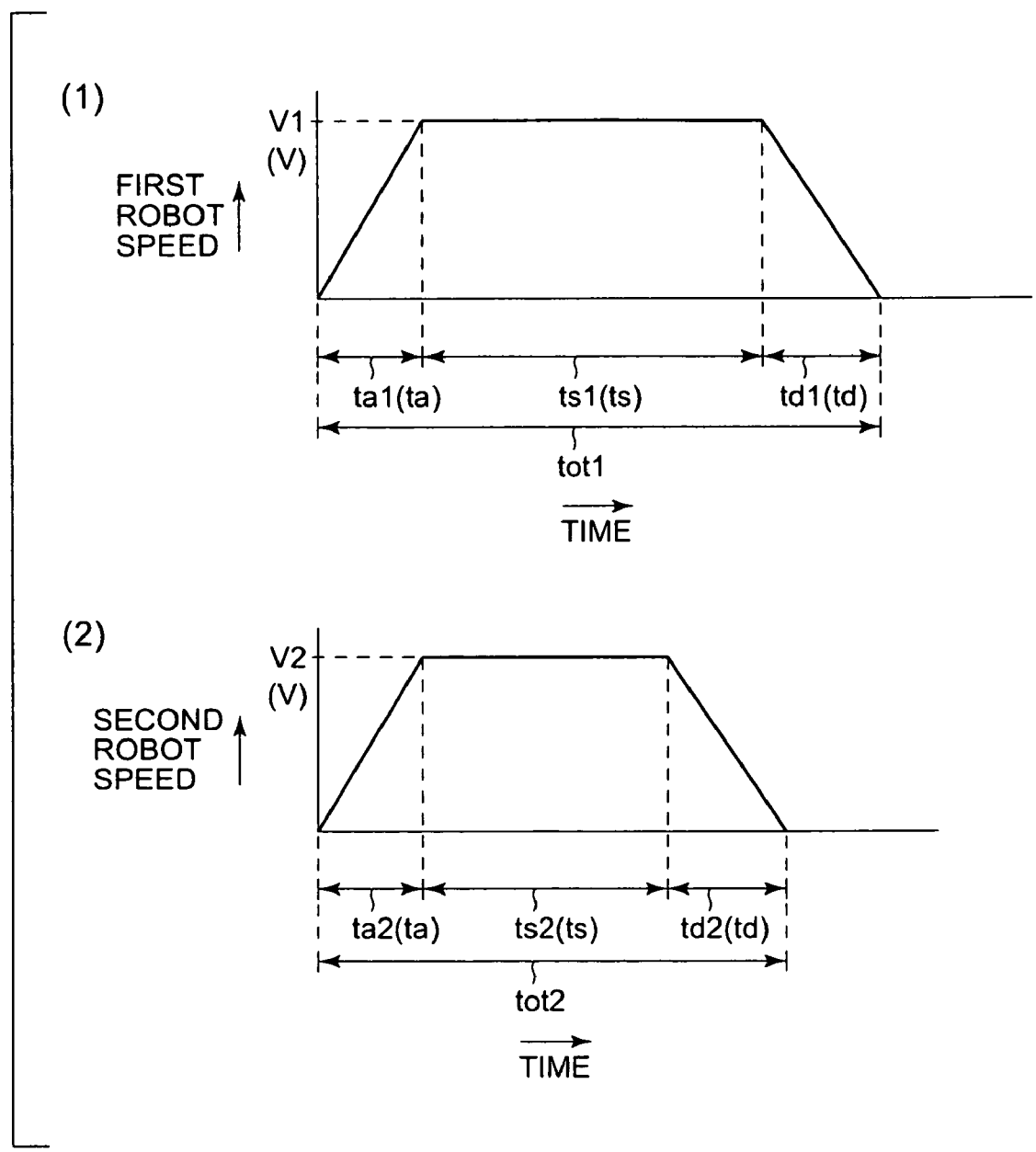
FIG. 4 includes graphs for explaining recalculation of an operation plan at Step a5.
Figure 5:
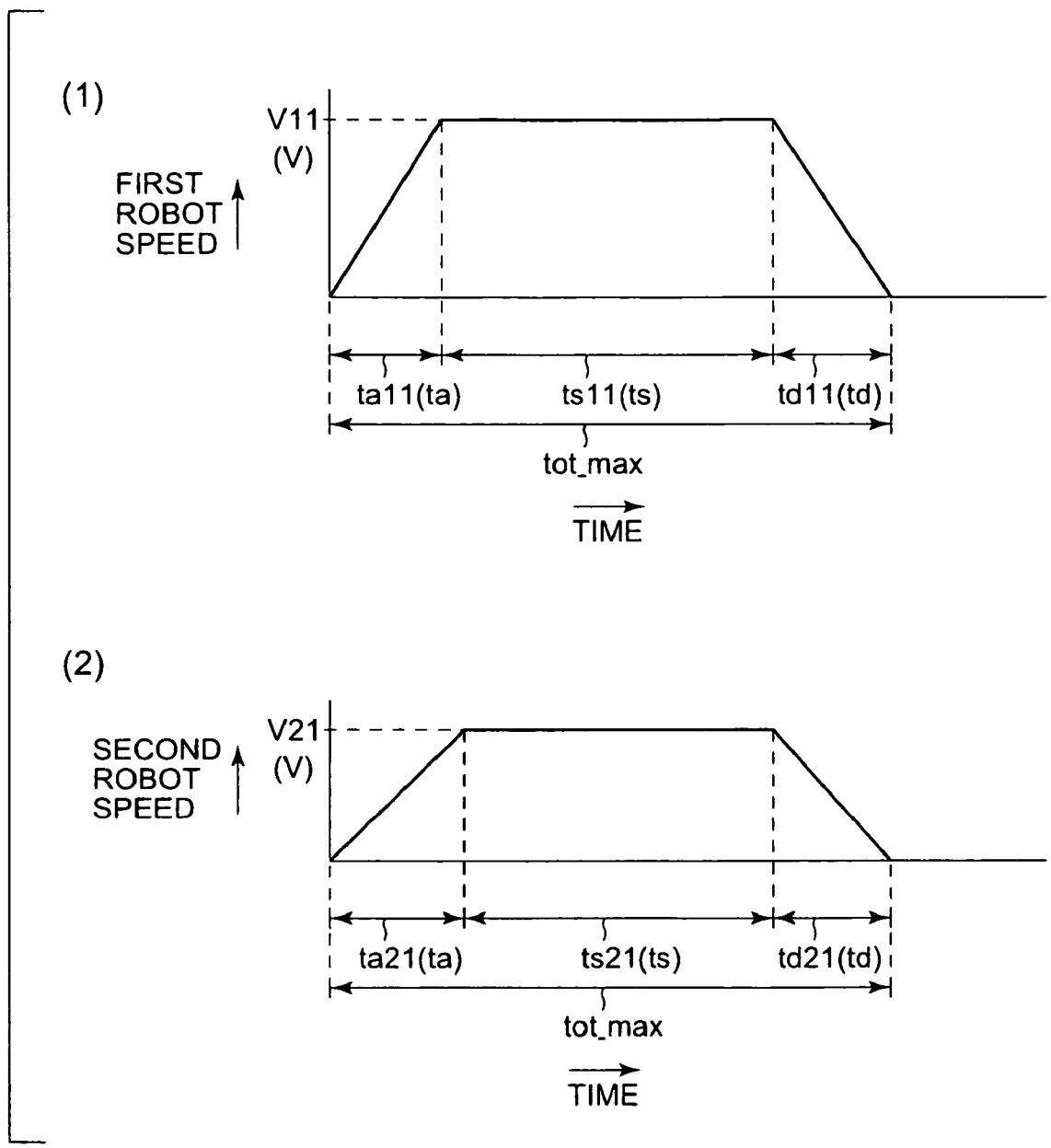
FIG. 5 includes graphs for explaining recalculation of the operation plan at Step a5.

FIGS. 4 and 5 are graphs for explaining the recalculation of the operation plan at Step a5. A case that the robot hand 19 of the first robot 21A and the robot hand 19 of the second robot 21B are simultaneously moved from the synchronous operation position will be explained. FIG. 4 shows the first operation plan calculated at Step a1. Further, FIG. 5 shows the second operation plan calculated at Step a5. The operation plan of each of the robots 21 depends on the movement start position of each of the robots 21, synchronous operation position, movement route, setting speed, setting acceleration, setting deceleration, acceleration capacity of each axis, maximum speed capacity of each axis, and deceleration capacity of each axis. Therefore, even if simultaneously starting movement from the respective set movement start positions, the times when the robots hands 19 of the robots 21A and 21B respectively reach the synchronous operation positions in the first movement times tot1 and tot2 each of which is shortest time are different from each other. For example, as shown in FIG. 4, the first movement time tots of the first robot 21A is longer than the first movement time tot2 of the second robot 21B.

In this case, with respect to the operation plan of the first robot 21A, as shown in FIGS. 4(1) and 5(1), the first operation plan and second operation plan are the same. On the other hand, with respect to the operation plan of the second robot 21B, as shown in FIGS. 4(2) and 5(2), the second movement time tot_max is extended compared with the first movement time tot2 and is set so as to be equal to the first movement time tots of the first robot 21A. Further, in the second operation plan, in correspondence to the extended movement time, the mean moving speed from start of the movement to stop is set so as to be decreased. By doing this, when the robot hand 19 of the first robot 21A reaches the synchronous position, the robot hand 19 of the second robot 21B can reach the synchronous position. In this embodiment, to lower the mean moving speed, not only the maximum moving speed during movement but also the acceleration and deceleration are lowered.

Concretely, the robot hand 19, during movement from the movement start position to the synchronous operation position, moves by performing sequentially an acceleration, a uniform, and a deceleration movement and acceleration time ta, uniform time ts, and deceleration time td are set. The robot hand 19, during the acceleration time ta after starting movement from the movement start position, is accelerated at predetermined acceleration and reaches a predetermined speed V. Further, during the uniform time ts after reaching the acceleration time ta, the robot hand 19 performs a uniform movement at the predetermined speed V. Further, during the deceleration time td after reaching the uniform time ts, the robot hand 19 is decelerated. And, when reaching the deceleration time td, the robot hand 19 reaches the synchronous operation position and stops there.

As shown in FIG. 4(1), the acceleration time of the robot hand 19 of the first robot 21A in the first operation plan are assumed as ta1, the uniform time as ts1, the deceleration time as td1, and the speed during uniform speed as V1. Further, as shown in FIG. 4(2), the acceleration time of the robot hand 19 of the second robot 21B in the first operation plan are assumed as ta2, the uniform time as ts2, the deceleration time as td2, and the speed during uniform speed as V2. Further, the first movement time of the first robot is assumed as tot1 and the first movement time of the second robot is assumed as tot2.

Further, as shown in FIG. 5(1), the acceleration time of the robot hand 19 of the first robot 21A in the second operation plan is assumed as ta11, the uniform time as ts11, the deceleration time as td11, and the speed during uniform speed as V11. Further, as shown in FIG. 5(2), the acceleration time of the robot hand 19 of the second robot 21B in the second operation plan is assumed as ta21, the uniform time as ts21, the deceleration time as td21, and the speed during uniform speed as V21. Further, among the first movement time tots and tot2 of the first robot 21A and second robot 21B, the maximum first movement time becomes the second movement time and the second movement time is assumed as tot_max.

In this case, the second CPU 39 calculates the following calculation expressions, thereby can calculate the second operation plan of each of the robots 21.

$$ta11 = ta1 \cdot tot\_max / tot1$$

$$ts11 = ts1 \cdot tot\_max / tot1$$

$$td11 = td1 \cdot tot\_max / tot1$$

$$V11 = V1 \cdot tot1 / tot\_max$$

$$ta21 = ta2 \cdot tot\_max / tot2$$

$$ts21 = ts2 \cdot tot\_max / tot2$$

$$td21 = td2 \cdot tot\_max / tot2$$

$$V21 = V2 \cdot tot2 / tot\_max$$

According to the calculation expressions aforementioned, in the second operation plan, the acceleration time ta11 and ta21 of the robots, the uniform time ts11 and ts21, deceleration time td11 and td21, and movement time V11 and V21 are calculated, thus the robot hands 19 can reach simultaneously the synchronous operation positions set for each robot.

In this embodiment, as the operation plan of the second robot 21B, when the second movement time tot_max decided is longer than the first movement time tot2, the second movement plan is generated so as to lower the speed of the robot hand 19 and also the acceleration and deceleration, compared with a case of movement in the first movement time tot2. By doing this, compared with a case that only the speed is lowered during movement from the movement start position to the synchronous operation position, the energy consumption can be lowered furthermore. Further, by use of the simple calculation expressions aforementioned, the second operation plan can be calculated in a short time.

Further, these calculation expressions are an example of the present invention. For example, even when the moving speed during uniform speed is lowered and the acceleration and deceleration are made equivalent to those before recalculation, or even when the acceleration and deceleration are lowered and the moving speed during uniform speed is made equivalent to that before recalculation, the robot hands 19 can simultaneously reach the synchronous operation position. Namely, if any speed change is one for realizing that the robot hands 19 start movement simultaneously from the movement start positions and simultaneously reach the synchronous operation positions, it is acceptable. Further, the synchronization of two robots is explained above. However, even if the number of robots to be synchronized is three or more, the synchronization can be obtained by the similar calculation expressions.

Figure 6:
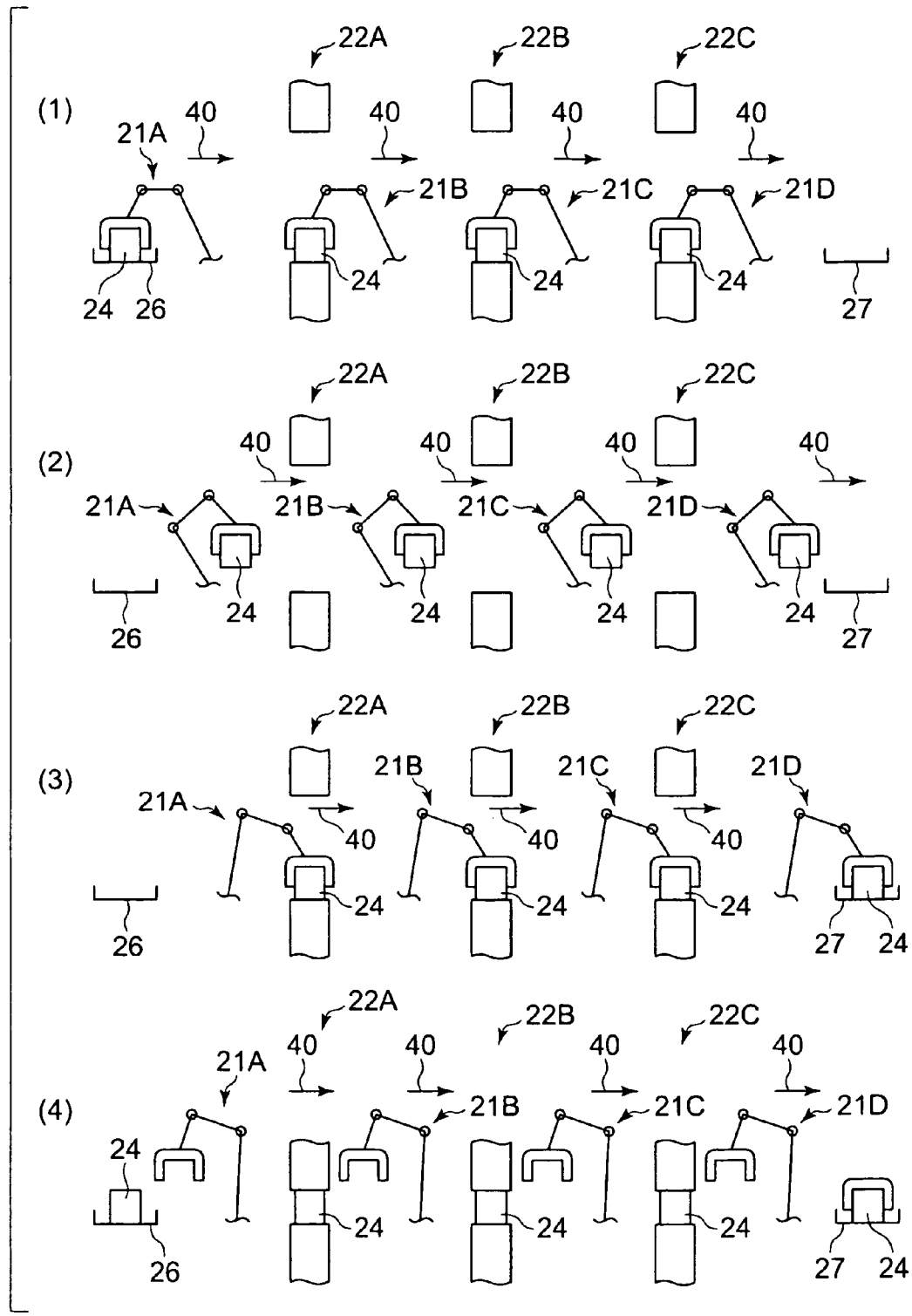
FIG. 6 includes drawings showing the operation of each robot of this embodiment.

Referring to FIG. 6, the robots operate in the order of FIGS. 6(1) to 6(4) and when finishing the operation shown in FIG. 6(4), return to the operation shown in FIG. 6(1) and perform again the operation in the order of FIGS. 6(1) to 6(4).

In the preparation period that the top force and bottom tool of the pressing machine 22 are separated from each other, at the first stage, as shown in FIG. 6(1), each of the robots 21 holds the workpiece 24 arranged on the unloading table 26 or the pressing machine 22 on the upstream side in the transfer direction 40. Next, at the second stage, as shown in FIG. 6(2), each of the robots 21 transfers the held workpiece 24 on the downstream side in the transfer direction 40. Next, at the third stage, as shown in FIG. 6(3), each of the robots 21 supplies the held workpiece 24 to the pressing machine 22 on the down stream side in the transfer direction or the loading table 27.

After such an operation is completed and each of the robots 21 is separated from the neighborhood of each of the pressing machines 22, each of the pressing machines 22 shifts from the preparation period to the pressing period. By doing this, the top force and bottom tool approach and press the workpiece 24 arranged at the pressing position. During this period, the robots 21 move toward the upstream side in the transfer direction 40. When the pressing of the workpiece 24 is completed, the pressing period shifts to the preparation period and the top force and bottom tool are separated from each other. And, the robot operations in the preparation period, that is, the operations at the first to third stages are performed again. At the first to third stages, in the state that the movement start position and synchronous operation position are respectively set for each robot and the robot hand 19 is moved from the movement start position to the synchronous operation position, the operations of the robots are performed simultaneously.

Figure 7:
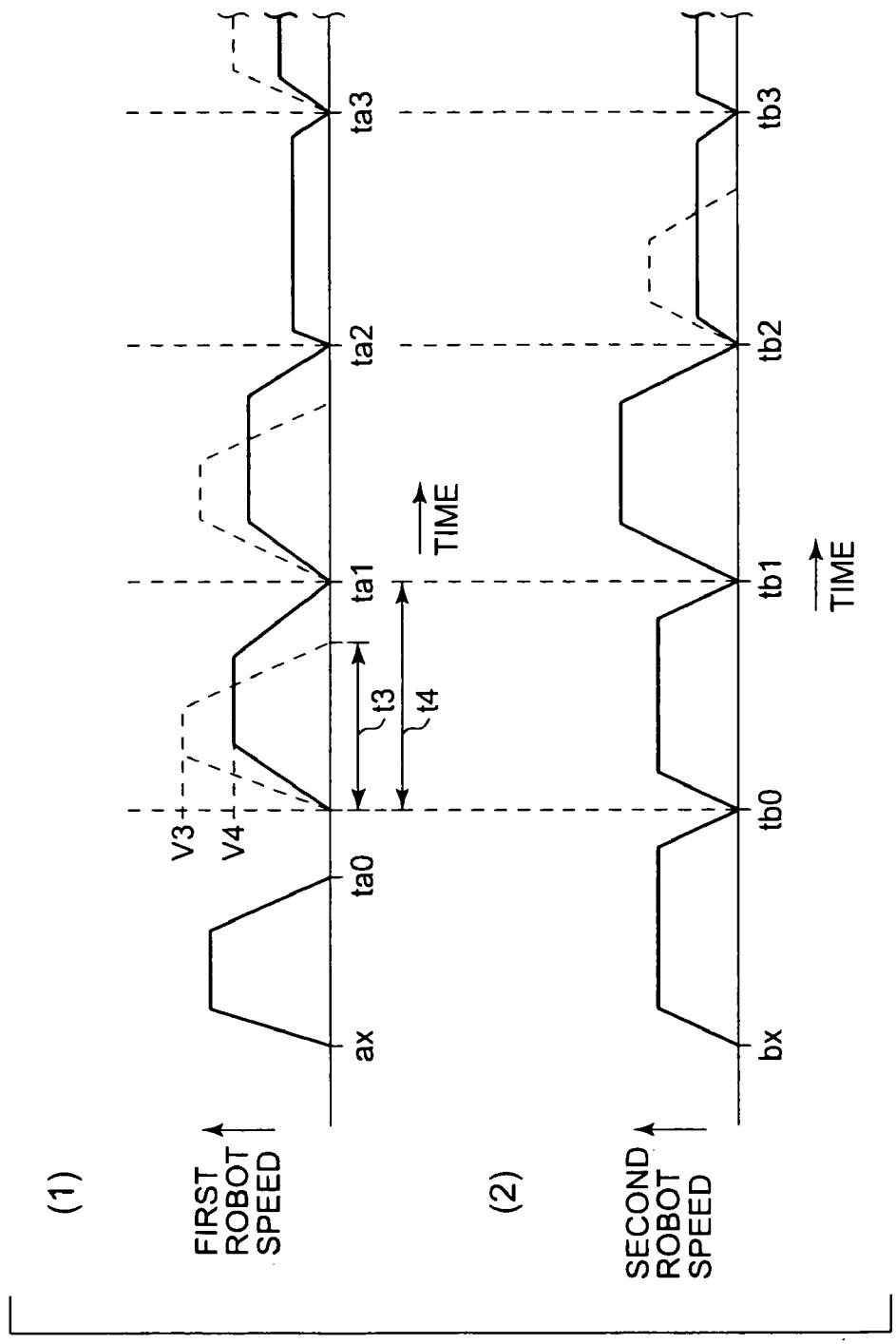
FIG. 7 includes graphs showing changes in the moving speed of robot hands 19 of a first robot 21A and a second robot 21B.

FIG. 7 includes graphs showing changes in the moving speed of the robot hands 19 of the first robots 21A and second robot 21B. FIG. 7(1) shows a change with time of the moving speed of the robot hand 19 of the first robot 21A. FIG. 7(2) shows a change with time of the moving speed of the robot hand 19 of the second robot 21B. The dashed lines shown in FIG. 7 show changes with time of the moving speed of each of the robot hands 19 in the first operation plan. Further, the solid lines shown in FIG. 7 show changes with time of the moving speed of each of the robot hands 19 in the second operation plan.

As shown in FIG. 1, the first controller 23A teaches beforehand a standby position ax, an initial position a0, and first to third positions a1 to a3. The standby position ax is a position where the robot hand 19 of the first robot 21A stands by. The initial position a0 is a holding position where the first robot 21A holds the workpiece 24 from the unloading table 26. Further, the first position a1 is a position where the workpiece 24 moves by a predetermined distance in the transfer direction 40 along the workpiece transfer route from the initial position a0. The second position a2 is a position where the workpiece 24 moves by a predetermined distance in the transfer direction 40 along the workpiece transfer route from the first position a1. The third position a3 is an arrangement position where the workpiece 24 is arranged on the first pressing machine 22 from the second position a2.

Further, the second controller 23B teaches beforehand a standby position bx, an initial position b0, and first to third positions b1 to b3. The standby position bx is a position where the robot hand 19 of the second robot 21B stands by. The initial position b0 is a position where the second robot 21B holds the workpiece 24 from the first pressing machine 22A and moves by a predetermined distance. Further, the first position b1 is a position where the workpiece 24 moves by a predetermined distance in the transfer direction 40 along the workpiece transfer route from the initial position b0. The second position b2 is a position where the workpiece 24 moves by a predetermined distance in the transfer direction 40 along the workpiece movement route from the first position b1. The third position b3 is a position where the workpiece 24 is arranged on the second pressing machine 22B from the second position b2 and the second robot 21B moves by a predetermined distance toward the downstream side in the transfer direction 40.

At the operation steps where the robot hands 19 move from the initial positions a0 and b0 to the first positions a1 and b1, the initial positions a0 and b0 are movement start positions and the first positions a1 and by are synchronous operation positions. Similarly, at the operation steps where the robot hands 19 move from the "n"th positions an and bn to the "n+1"th positions an+1 and bn+1, the "n"th positions an and bn are movement start positions and the "n+1"th positions an+1 and bn+1 are synchronous operation positions. Here, n indicates a natural number. The controllers 23, when the robot hands 19 of the robots 21A and 21B reach the preset first to third positions a1 to a3 and by to b3, control the robots so as to simultaneously start movement.

The controllers 23, when an operation instruction is given, calculate the first operation plan of the shortest time for moving the robot hands 19 from the standby positions ax and bx to the initial positions a0 and b0 (Step a1). For movement from the standby positions ax and bx to the initial positions a0 and b0, the synchronous operation is not decided so as to be performed, so that the controllers 23 move the robot hands respectively to the initial positions a0 and b0 in accordance with the first operation plan (Step a11). The robot hands 19 are different in the arrival time ta0 and tab at the initial positions a0 and b0 since the movement distance and transfer route thereof are different from each other The controllers 23, during movement of the robot hands 19 from the standby positions ax and bx to the initial positions a0 and b0, calculate the operation plan at the next operation step, that is, at the operation step of movement from the initial positions a0 and b0 to the first positions a1 and b1 (Step a1). For movement from the initial positions a0 and b0 to the first positions a1 and b1, the controllers 23, after execution of the operation for simultaneous arrival at the first positions a1 and by, calculate the second operation plan (Steps a3 to a5). By doing this, the movement time from movement start from the initial positions a0 and b0 to arrival at the first positions a1 and by becomes the same every robot hand. At this time, as shown in FIG. 7(1), when the second movement time t4 of the first robot hand 19 is set longer than the first movement time t3, the moving speed V4 in the second operation plan is set lower than the moving speed V3 in the first operation plan.

The controllers 23, during movement of the robot hands 19 from the initial positions a0 and b0 to the first positions a1 and by, calculate the next operation, that is, the operation plan of movement from the first positions a1 and by to the second positions a2 and b2 (Step a1). For movement from the first positions a1 and b1 to the second positions a2 and b2, the controllers 23, after execution of the operation for simultaneous arrival at the second positions a2 and b2, recalculate the operation plan (Steps a3 to a5). By doing this, the movement time from movement start from the first positions a1 and by to arrival at the second positions a2 and b2 becomes the same every robot hand.

As mentioned above, in this embodiment, when simultaneously operating the robots 21 at the synchronous operation position, the controllers 23 adjust the speeds of the robot hands 19 reaching the synchronous operation position and calculate the operation plan at the preceding operation step so that the robots 21 simultaneously reach the synchronous operation position. By doing this, there is no need to unnecessarily stop the robot hands 19.

Figure 8:
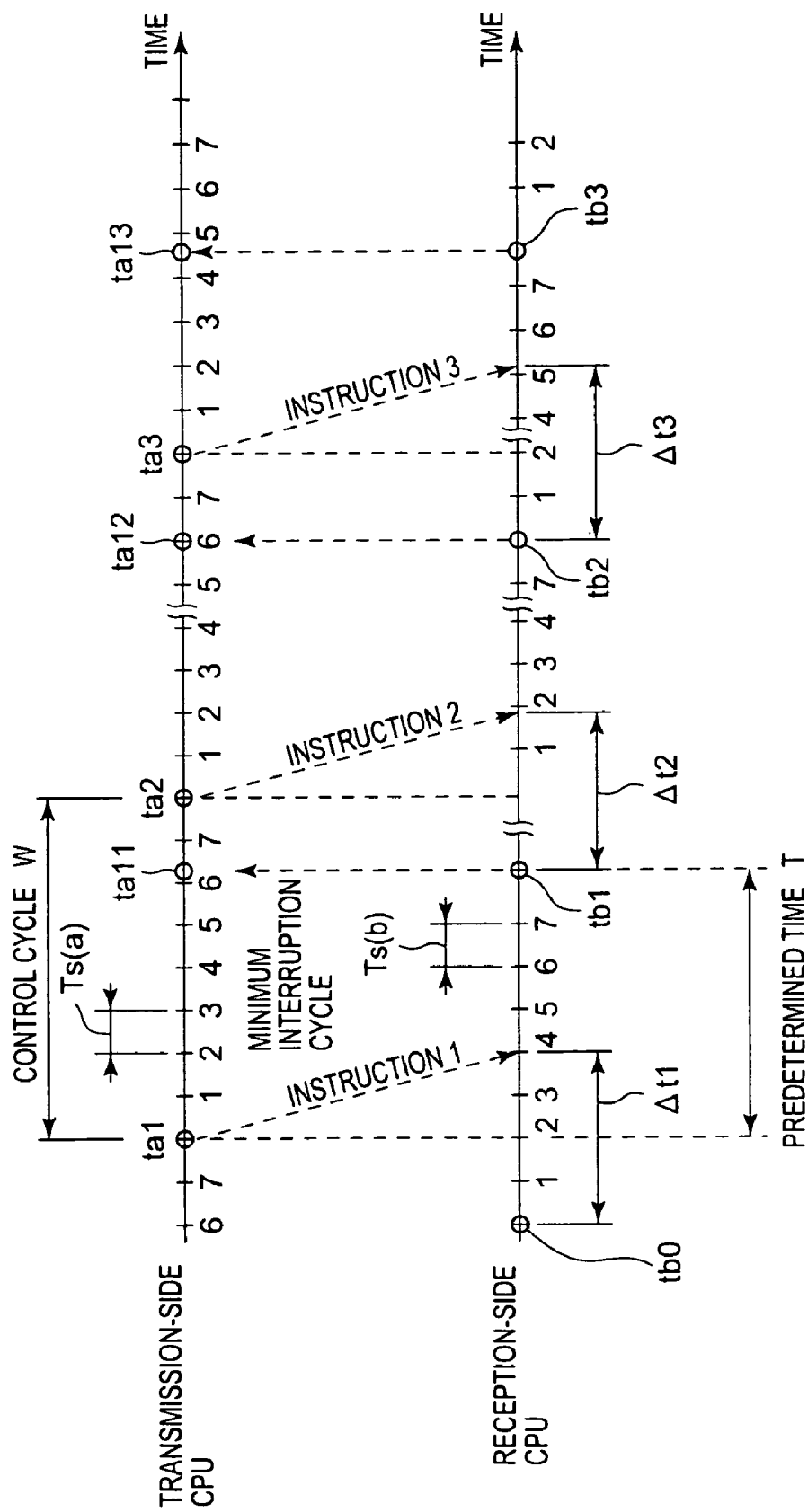
FIG. 8 is a drawing for explaining the synchronous processing function of each CPU.

FIG. 8 is a drawing for explaining the synchronous processing function of each CPU. In this embodiment, the CPU installed in each of the controllers 23 is structured so as to suppress variations in the control period. Each CPU has a similar synchronous processing function. In this embodiment, the second CPU 39 of one controller 23 among the plurality of controllers 23 becomes a transmission-side CPU and the other second controllers 23 become reception-side CPUs. Further, the robot controlled by the transmission-side CPU becomes a transmission-side robot and the robots controlled by the reception-side CPUs become reception-side robots. Instruction signals transmitted from the transmission-side CPU every time of ta1, ta2, ta3, - - - in a predetermined control period W are received by the reception-side CPUs via a cable in time series at each time of (tb0+Δt1), (tb1+Δt2), (tb2+Δt3), - - - after a lapse of each predetermined time of Δt1, Δt2, Δt3, - - - from each preceding control time of tb0, tb1, tb2, - - - to the reception-side robots.

In such transmission of the operation instructions from the transmission-side CPU to the reception-side CPUs via a cable, there is communication delay time of the reception time (tb0+Δt1), (tb1+Δt2), (tb2+Δt3), - - - from the transmission time ta1, ta2, ta3, - - - which is caused by minute errors of the oscillation frequencies due to individual differences of the crystal oscillators built in the CPUs, so that the reception-side robots controlled by the reception-side CPUs are varied in the operation from the transmission-side robot controlled by the transmission-side CPU, thus relative position variations between the robots at the same time cannot be ignored from the viewpoint of operation accuracy.

With respect to the communication delay time aforementioned, as shown in FIG. 8, when the transmission-side CPU transmits an instruction 1 at the transmission time ta1, the transmitted instruction 1 is received by the reception-side CPUs at the reception time (tb0+Δt1). The reception time (tb0+Δt1) is the time when the predetermined time Ate elapses from the preceding control time tb0 for the robots to be controlled by the reception-side CPUs themselves, which is oscillation time of a timing signal at the fourth count of a minimum interruption period Ts (b) of the reception-side CPUs.

Next, at the time ta2 after a lapse of one control period, the transmission-side CPU transmits an instruction 2 and the instruction 2 is received by the reception-side CPUs at the next reception time (tb1+Δt2). However, as mentioned above, in the crystal oscillators built in the reception-side CPUs, with respect to the crystal oscillator built in the transmission-side CPU, there are minute errors of the oscillation frequency due to individual differences of the crystal oscillator for each CPU, so that the instruction 2 reaching between the first count and the second count of the minimum interruption period Ts (b) is received at the time (tb1+Δt2) at the second count from the preceding control time tb1. When the timing signal receives the instruction 2 at less than the third count from the preceding control time tb1 like this, the controller Cb on the reception side shortens its own minimum interruption period Tb (b) and controls so as to put the reception time (tb1+Δt2) between the third count and the fifth count.

Further, an instruction 3 transmitted from the transmission-side CPU at the time ta3 reaches the reception-side CPUs between the fifth count and the sixth count from the preceding control time tb2, so that it is received at the sixth count and the reception-side CPUs control the reception-side robots at the control time tb3. Therefore, the reception-side CPUs prolong the own minimum interruption period Ts (b) and control so as to put the reception time (tb2+Δt3) between the third count and the fifth count from the preceding control time tb2.

By doing this, in the reception-side CPUs, the time (tb1-ta), (tb2-ta1), (tb3-ta2), - - - from the time ta1, ta2, ta3, - - - when the instructions 1, 2, 3, - - - are transmitted from the transmission-side CPU to the time tb1, tb2, tb3, - - - when the instructions are received by the reception-side CPUs and the reception-side CPUs start to control the reception-side robots is prevented from exceeding the control period W. By doing this, an occurrence of a fault that the reception-side CPUs receive a plurality of operation instructions from the transmission-side CPU within one control period W of the reception-side CPUs or no operation instructions are received within one control period W is prevented surely and the transmission-side CPU and reception-side CPUs can perform a cooperative operation with high precision. Further, also in one controller, the similar operation is performed. Namely, any one of the CPUs of each controller, for example, the second CPU is assumed as a transmission-side CPU and the residual CPUs are assumed as a first CPU and a third CPU, thus the start timing of control execution operation can be synchronized.

As mentioned above, the robot controllers 23 in this embodiment generate the second operation plan for each robot so as to move the robot hands 19 from the movement start position to the synchronous operation position without stopping in the second movement time tot_max. And, the controllers 23 control the robots in accordance with the second operation plan generated. By doing this, the robot hands 19 move from the movement start position to the synchronous operation position without stopping and simultaneously reach the synchronous operation position. And, when the third CPU 42 moves to the synchronous operation position, the operations of the robots are performed simultaneously.

According to this embodiment, the robot hands 19 are prevented from stopping during movement from the movement start position to the synchronous operation position. By doing this, even if the moving speed, movement distance, and workpiece holding posture are varied between the robot hands, the robot hands 19 do not need to stand by at the synchronous operation position and can reach simultaneously each synchronous operation position. Therefore, compared with a case that the robots 21 move at the maximum speed and stand by at the synchronous operation position, the cycle time of each robot is not increased, and the robots 21 can be moved at a low speed, and the moving speed of each robot is prevented from increasing unnecessarily, and the energy consumption is lowered, and the energy efficiency can be improved.

Further, the controllers 23 recalculate the speed of each robot, acceleration, and deceleration at time of calculation of the operation plan, so that the operator does not need to adjust the operation timing such as the moving speed of each of the robots 21 in order to simultaneously move each of the robot hands 19 to each synchronous operation position. Further, even when the movement start position and synchronous operation position of each of the robot hands 19 are changed, the operator does not need to adjust the moving speed of each of the robots 21 in correspondence to the change. Therefore, the time required for the preparation operation for execution of the robot operation can be shortened and the convenience can be improved.

Further, as shown at Steps a7 and a8, after all the robots to be operated simultaneously enter the operation completion state, the robots simultaneously start the next operations. By doing this, variations in the operation caused by variations in the robot control cycle and variations in the operation completion time can be prevented. Therefore, even if the operations to be performed simultaneously are performed continuously several times, variations in the operations of the robots are not accumulated and the synchronous operation of each robot can be performed stably. Further, as shown in FIG. 8, the CPUs of the controllers have a function for restricting mutual time lags, so that the time lag due to control period variations of the CPUs can be suppressed. By doing this, each robot can simultaneously reach more accurately the synchronous operation position.

Further, in this embodiment, the controllers 23 are respectively installed for each robot. Therefore, with respect to the pressing equipment 20 in which a plurality of robots 21 are installed, the controllers 23 are increased or decreased in correspondence to increasing or decreasing in the robots 21, thus the robots 21 can perform the synchronous operation. For example, when further adding one robot 21, one controller 23 is added together with the robot 21, thus there is no need to greatly change the control program of the controllers 23 corresponding to the existing robots 21. Similarly, when reducing one robot 21, there is no need to greatly change the control program of the controllers 23 corresponding to the residual robots 21. Therefore, the robots 21 can be easily increased or decreased. Further, in the existing robots, there are many cases that one controller is installed in correspondence to a robot. In such a case, the program of the controller is rewritten, thereby the controller in this embodiment can be realized. Therefore, the existing controllers can be easily made use of and each controller in this embodiment can be realized at low cost. Further, there is no need to install an exclusive controller for making the robots perform the synchronous operation.

Further, the controllers 23 in this embodiment have a function for suppressing variations in the control synchronization, though they have no relationship of master and slave and are independent of each other. Therefore, the degree of freedom of the robot operation synchronously controlled by each of the controllers 23 can be enlarged. For example, as a comparison example, when controlling synchronously a plurality of robots by a master controller for controlling other controllers and slave controllers controlled by the master controller, the reception-side robots controlled by the slave controllers perform only the operation corresponding to the transmission-side robot controlled by the master controller. Concretely, when the transmission-side robot moves linearly, the reception-side robots also move linearly and it is difficult for the reception-side robots to move curvilineally.

On the other hand, each robot controlled by each controller in this embodiment is only adjusted for its moving speed and can independently perform an individual operation. Therefore, when one robot moves linearly and another robot moves curvilineally, the time for reaching the synchronous position can coincide with each other. Further, one robot and another robot performing the synchronous operation can perform quite different operations. As mentioned above, in this embodiment, the degree of freedom of the synchronous operation of the robots can be enlarged.

Further, when a plurality of robots 21 perform the synchronous operation, as shown at Steps a3 to a5 in FIG. 3, the controllers 23 generate the second operation plan which is a synchronous operation plan for the corresponding robots 21. Further, when independently operating a robot among the plurality of robots 21 regardless of the other robots 21, as shown at Steps a11 to a13 in FIG. 3, the controller 23 generates an independent operation plan for the corresponding robot.

As mentioned above, the operation plan of the synchronous operation and independent operation of the robots 21 can be generated, thus among a plurality of operation steps of one operation program, the synchronous operation step and independent operation step can be included in it. For example, even if a robot moves independently of the other robots, when there is no fear of interference, the robots respectively perform the independent operation, thus the robots 21 can be operated efficiently. In the pressing equipment 20 aforementioned, the operation step of collecting the workpiece 24 from the unloading table 26 and the operation step of arranging the workpiece 24 on the loading table 27 are free of a fear of interference with other robots 21, so that they may be operated by the independent operation.

Further, in this embodiment, the information of the first movement time given from another controller 23 to perform the synchronous operation is given before execution of the synchronous operation. Therefore, when actually performing the synchronous operation, the robot can operate regardless of the information given from another controller 23 and each robot hand can be operated smoothly. Further, in this embodiment, among the robots 21, execution of the operation in correspondence to the slowest robot 21 is calculated automatically. Therefore, when the moving speed of the slowest robot 21 is improved, the overall cycle time can be improved easily without changing the programs of the other robots.

Further, in this embodiment, when the stop switch 46 confirms input of the stop instruction of the robot, the operation of each robot performing the synchronous operation can be stopped. By doing this, the robots can be prevented from mutual interference. Further, the operator, after giving the stop instruction of one robot 21, does not need to give independently an instruction for stopping the operation of other robots 21 performing the synchronous operation for each controller and the convenience can be improved. Similarly, when confirming input of a restart instruction of the robot, the input-output unit 42 can restart the operation of each robot to perform the synchronous operation. By doing this, the robots can be prevented from mutual interference at restart time. Further, after giving the restart instruction of one robot 21, the operator does not need to give independently an instruction for restarting the operation of other robots 21 performing the synchronous operation for each controller and the convenience can be improved.

Figure 9:
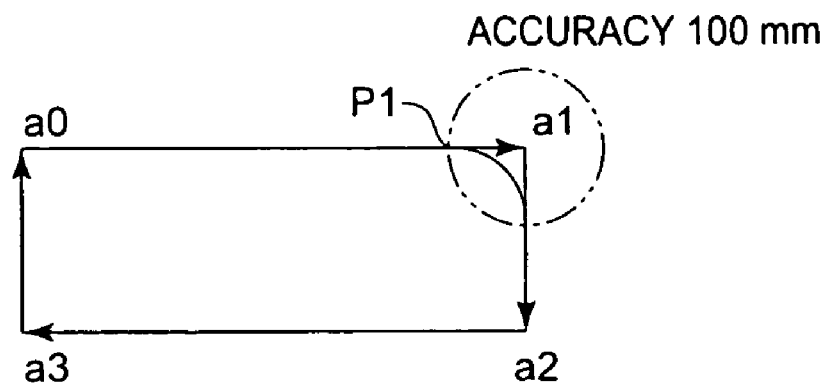
FIG. 9 includes drawings showing the movement route of each of the robot hands 19 for which the accuracy range is set.
Figure 9:
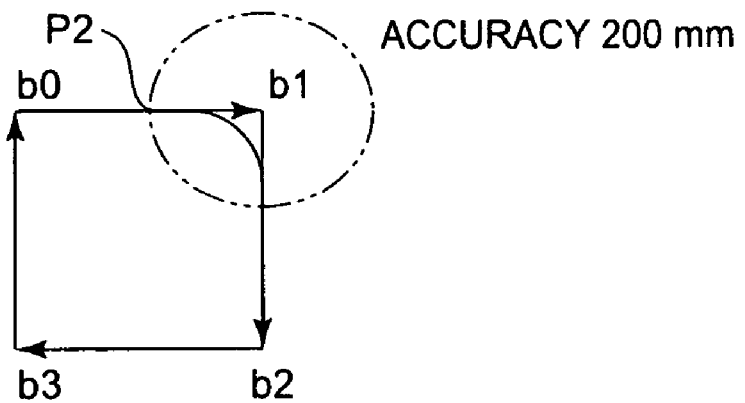

FIG. 9 includes drawings showing the movement route of each of the robot hands 19 for which the accuracy range is set. FIG. 9(1) is a drawing showing the movement route of the robot hand 19 of the first robot 21A. FIG. 9(2) is a drawing showing the movement route of the robot hand 19 of the second robot 21B.

The first robot 21 passes through the neighborhood of the first position a1 from the standby position a0 and sequentially passes through the second position a2 and third position a3. The second robot passes through the neighborhood of the first position b1 from the standby position b0 and sequentially passes through the second position b2 and third position b3.

For the robots 21, predetermined accuracy ranges P1 and P2 are respectively set at the first positions a1 and b1. The robots 21, when entering the accuracy ranges P1 and P2 around the first positions a1 and b1 during moving toward the first positions a1 and b1, perform the operations moving to the first positions a1 and b1 and also the operations moving to the second positions a2 and b2. Therefore, the robot hands 19, as shown in FIG. 9, without passing through the first positions a1 and b1, move smoothly in the neighborhood of the first positions a1 and b1 and then moves from the standby positions a0 and b0 to the second positions a2 and b2.

Figure 10:
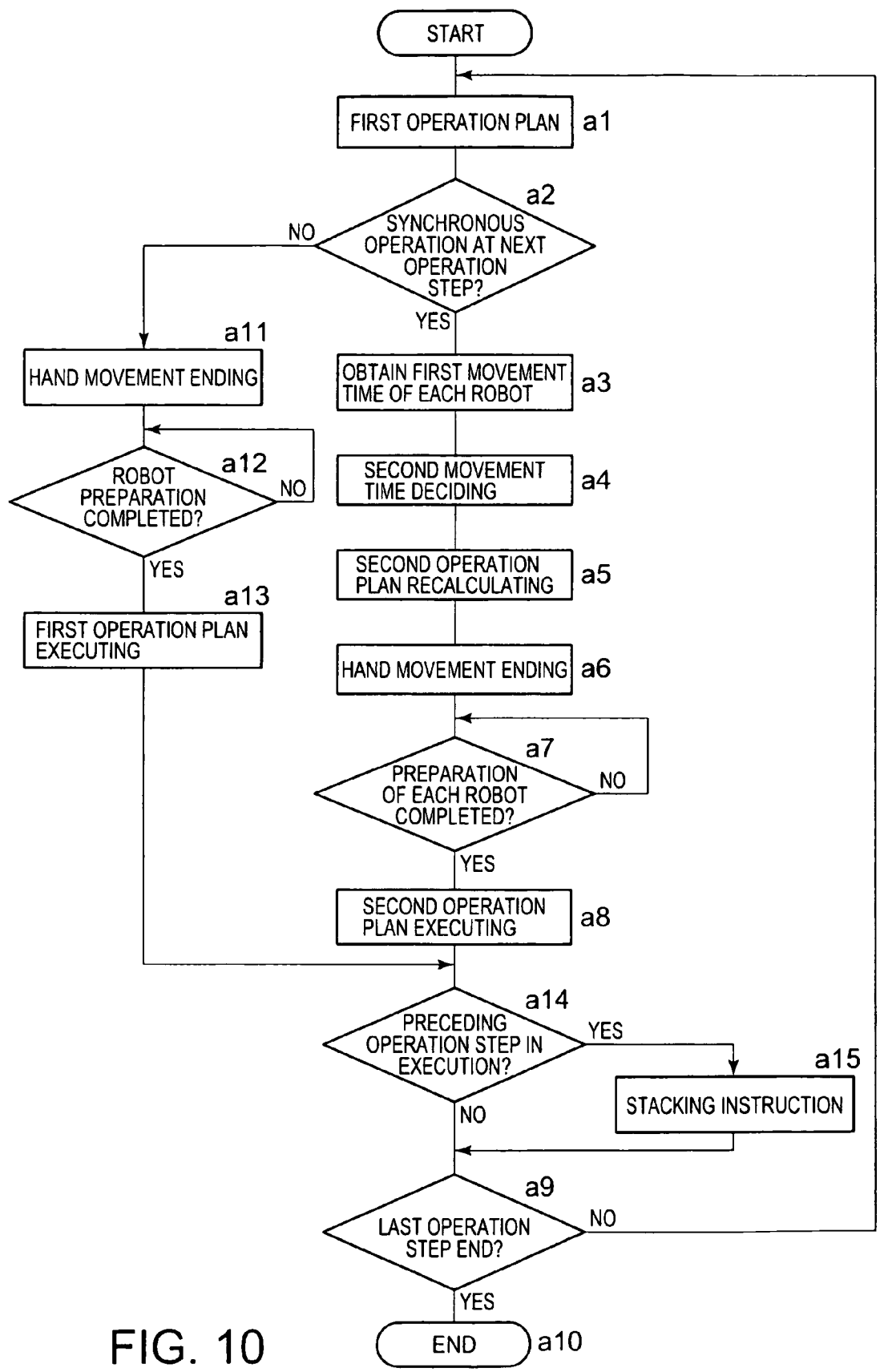
FIG. 10 is a flow chart showing the control procedure of the controller 23 when the accuracy range is set.
Figure 11:
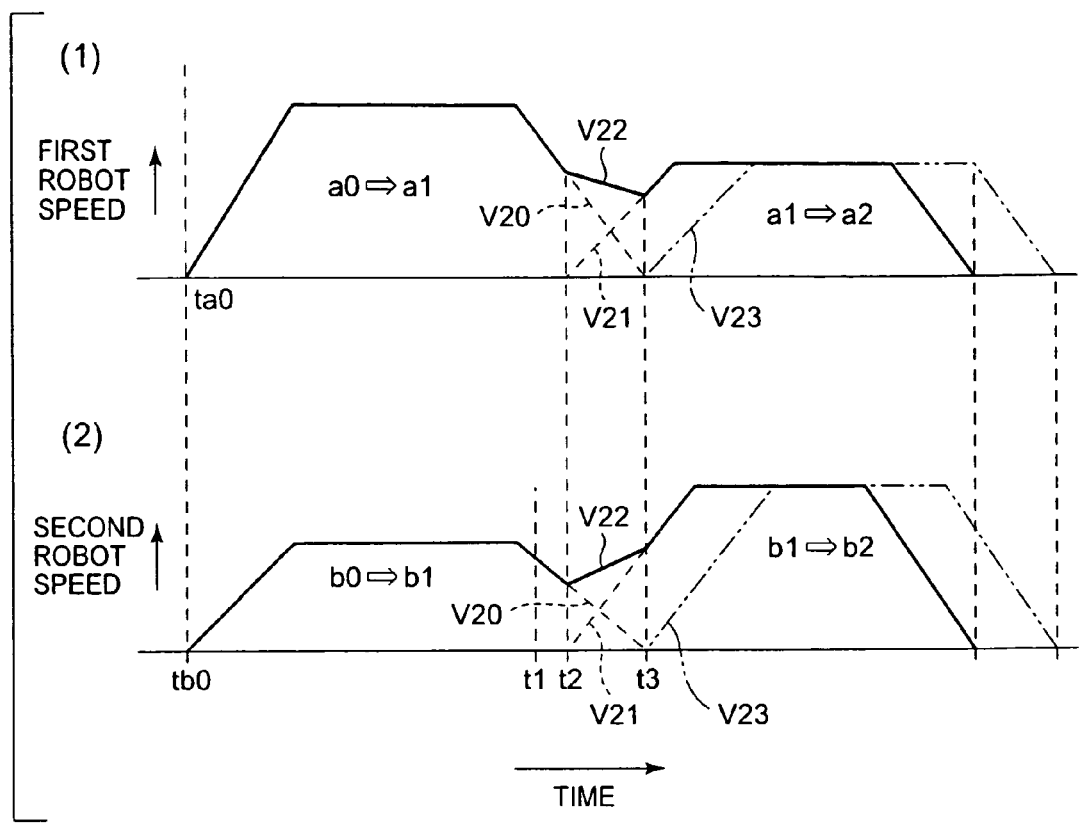
FIG. 11 includes graphs showing speed changes of the robot hands when controlling the robots so that the time when the robots pass through the neighborhood of the first positions a1 and b1, the time when the robots pass through the second positions a2 and b2, and the time when the robots pass through the third positions a3 and b3 are respectively the same.

FIG. 10 is a flow chart showing the control procedure of the controller 23 when the accuracy range is set. FIG. 11 includes graphs showing speed changes of the robot hands 19 when controlling the robots so as to make the time when the robots pass through the neighborhood of the first positions a1 and b1 equal to the time when the robots pass through the second positions a2 and b2 and the third positions a3 and b3. FIG. 11(1) shows speed changes of the robot hand 19 of the first robot 21A and FIG. 11(2) shows speed changes of the robot hand 19 of the second robot 21B. Further, in FIG. 11, speed changes of the hand moving from the first position a1 to the second position a2 when the accuracy range is not set are indicated by the two-dot chain line.

In this embodiment, the second CPU 39, when the robot hands 19 enter the predetermined accuracy ranges P1 and P2, judges that they reach the synchronous operation position. In the case that the accuracy ranges P1 and P2 are set and the case that they are not set, the operation procedures thereof are similar, so that the explanation of the same procedure will be omitted. The second CPU 39 transmits the information indicating that the robot controllers 19 perform the same operation as that shown in FIG. 3 and enter the operation completion state at Step a6 to the second CPUs 39 of the other controllers 23. In this embodiment, the operation completion conditions at Step a7 meet a11 the conditions of (1) the robot hands 19 enter the predetermined accuracy ranges, (2) the calculation of the operation plan in the next operation of the robot hands 19 is completed, and (3) the standby condition such as signal standby of the robot hands 19 is released.

Further, the second CPU 39, after giving the second operation plan to the second CPUs of the other controllers 23 at Step a8, goes to Step a14. At Step a14, when the robot performs the just prior operation for the second operation plan recalculated at Step a5, the second CPU 39 goes to Step a15. At Step a15, the second CPU 39 prepares a movement position in which the operation plan executed by the just prior operation and the second operation plan recalculated at Step a5 are stacked, gives calculation results obtained by the interpolation calculation of the concerned movement position to the third CPU 42, and goes to Step a9. The other operation procedures can be executed similarly to that shown in FIG. 3.

For example, at Step a6, the first controller outputs an operation completion signal at the first robot accuracy range arrival time t2 when the first robot 21A enters the accuracy range P1 of the first position a1. Further, the second controller outputs an operation completion signal at the second robot accuracy range arrival time to when the second robot 21B enters the accuracy range P2 of the first position be. When the robot accuracy range arrival time t1 and t2 are varied, at Step a7, when the robot reaches the subsequent time t2, the second CPU 39 judges that the operation preparation of the first and second robots is completed and goes to Step a8.

The second CPU 39 given the stacking instruction at Step a15 calculates a plurality of composite movement positions obtained by adding the movement positions in accordance with the old operation plan at the operation step at the present time and the movement positions in accordance with the second operation plan recalculated at Step a5. And, the second CPU 39 performs the interpolation calculation for the plurality of composite movement positions and gives the calculation results to the third CPU 42.

For example, in FIG. 9, in the old operation plan of movement from the initial position a0 to the first position a1, the position vector of the movement position when predetermined first time t1 elapses from the time t2 when the first and second robot hands 19 respectively reach the accurate ranges P1 and P2 is assumed as Ai. Further, in the operation plan of movement from the first position a1 to the second position a2, the position vector of the movement position when the predetermined first time to elapses from the first position al is assumed as Bi. Further, the position vector of the first position a1 is assumed as a1.

In this case, a composite position between the time t2 when the first and second robot hands 19 respectively reach the accuracy ranges P1 and P2 and the time t3 when the robot hands are expected to reach the first position a1 in the old operation plan is expressed as Ai+(Bi−a1). Here, Ai, Bi, and a1 are values indicating the position vectors. Therefore, the expression aforementioned is a vector calculation expression. Further, a composite position after the time t3 when the robot hands are expected to reach the first position a1 in the old operation plan is expressed as Bi.

Therefore, as shown in FIG. 11, in the operation plan that the hands are moved from the initial position a0 to the first position a1 from the time t2 when a11 the operation completion signals are transmitted, until the time t3 when the robot hands 19 are expected to reach the first position a1, the robot hands 19 are moved at a speed V22 obtained by adding a speed V20 at the operation step at the present time and a speed V21 when the movement is started at the time t2 when all the operation completion signals are transmitted at a speed V23 at the next operation step. Here, the speed means a speed vector including the direction and size.

As mentioned above, according to this embodiment, when the robot hands are moved within the synchronous operation range from the movement start positions respectively set for each robot to the neighborhood of predetermined synchronous operation positions, the operations of the robots can be performed simultaneously. Further, the aforementioned effects can be accomplished and the robots can be operated smoothly. Further, the hands can be moved without stopping at the first positions a1 and b1 and compared with a case that no accuracy range is set, the time required for arrival at the second positions a2 and b2 can be shortened. Table 1 shows operation programs when the first robot hand 21A and second robot hand 21B of the pressing equipment 20 shown in FIG. 1 are set within the accuracy range.

TABLE 1

| First robot program | Second robot program | Explanation of programs |
|---|---|---|
| JMOVE ax | JMOVE bx | The robot move to the standby positions ax and bx. |
| ACCURACY 100 ALWAYS | ACCURACY 100 ALWAYS | Unless otherwise specified at the following operation steps, the accuracy range is within a radius of 100 mm centering on the target movement position. |
| SYNC 1, 2, 3, 4 | SYNC 1, 2, 3, 4 | The first to fourth robots perform the synchronous operation. |
| 10 ACCURACY 1 | 10 ACCURACY 1 | The accuracy range is within a radius of 1 mm centering on the initial positions a0 and b0. |
| SPEED 30 | SPEED 30 | The speed is set to 30% of the maximum speed so as to enable to hold a workpiece. |
| LMOVE a0 | LMOVE b0 | The robots move linearly toward the initial positions a0 and b0 within the accuracy range and at the moving speed which are aforementioned. |
| CLOSE 1 | CLOSE1 | The robot hands are closed from the opened state and hold the workpiece 24. |
| LMOVE a1 | LMOVE b1 | The robots move linearly toward the first positions a1 and b1. |
| LMOVE a2 | LMOVE b2 | The robots move linearly toward the second positions a2 and b2. |
| ACCURACY 1 | ACCURACY 2 | The accuracy range is within a radius of 1 mm centering on the third positions a3 and b3. |
| SPEED 30 | SPEED 30 | The speed is set to 30% of the maximum speed so as to enable to release holding of a workpiece. |
| LMOVE a3 | LMOVE b3 | The robots move toward the third positions a3 and b3 within the accuracy range and at the moving speed which are aforementioned. |
| OPEN 1 | OPEN 1 | The robot hands are opened from the closed state and release holding the workpiece 24. |
| LMOVE a2 | LMOVE b2 | The robots move to the second positions a2 and b2. |
| LMOVE a1 | LMOVE b1 | The robots move to the first positions a2 and b2. |
| GO TO 10 | GO TO 10 | The robots, after starting the synchronous operation, execute and repeat the operation step of "10 ACCURACY 1". |
| ALONE 1, 2, 3, 4 | ALONE 1, 2, 3, 4 | The first to fourth robots are released from synchronization. |

The first and second robot controllers execute the programs shown in Table 1, thus the workpiece 24 can be transferred between the pressing machines. At this time, the time required to reach the operation positions such as the initial positions a0 and b0, first positions a1 and b1, second positions a2 and b2, and third positions a3 and b1 is made equal, thus the synchronous operation is performed. The synchronization of this embodiment is executed, so that manual timing adjustment is not required, and the energy consumption is reduced, and the synchronous operations of the robots can be performed simultaneously. Further, the accuracy range is set, so that the robots can be operated smoothly, and the reduction in the speed of each robot can be suppressed, and furthermore, the energy consumption can be reduced.

As shown in Table 1, in this embodiment, the interval from execution of an SYNC command which is a synchronous operation command to execution of an ALONE command which is a synchronization release command is a predetermined synchronous period. During this synchronous period, the synchronous operation of each robot is continuously performed several times. In this embodiment, during the synchronous period, an LMOVE command such as a movement command of movement to the initial positions a0 and b0, a movement command of movement to the first positions a1 and b1, a movement command of movement to the second positions a2 and b2, or a movement command of movement to the third positions a3 and b3 is equivalent to the synchronous operation.

The first CPU 32 decodes the operation program of the target robot. And, when the synchronous period is set in the operation of the target robot, the first CPU 32 counts the frequency of the synchronous operation to be performed during the synchronous period. And, before generation of the operation plan, the first CPU 32 gives the information indicating the counted frequency to the first CPUs 32 of the other controllers via the controller communication unit 37 and hub 25. And, the first CPU 32 judges whether the frequencies of the synchronous operation of the robots to perform the synchronous operation are equal to each other during the corresponding synchronous period. The first CPU 32, when judging that the frequencies of the synchronous operation are not equal to each other, before generation of the robot operation plan, reports that the frequencies of the synchronous operation are not equal to each other. Namely, the first CPU 32 becomes an inspecting means for inspecting an error of the program. Therefore, the operator can judge that the operation program of any of the robots is abnormal, thereby can correct the error of the operation program before execution of the synchronous operation of each robot.

Further, the second CPU 39, when judging that the operation of the robot performing the interpolation calculation is a synchronous operation, checks for what number synchronous operation after execution of the SYNC command it is. And, the second CPU 39 gives the information indicating what number synchronous operation it is to the second CPUs 39 of the other controllers via the controller communication unit 37 and hub 25. And, the second CPU 39 judges whether the synchronous operation of the robot performing the interpolation calculation among a plurality of synchronous operations of the target robot and the synchronous operation of another robot performing the interpolation calculation simultaneously with execution of the interpolation calculation among a plurality of synchronous operations of the other robots are the same in the order after execution of the SYNC command or not.

For example, the second CPU 39, when judging that when the second CPU 39 of the first robot performs the interpolation calculation of the LMOVE a1 command which is the second synchronous operation counted from the SYNC command, the second CPU 39 of the second robot performs the interpolation calculation of the LMOVE b2 command which is the third synchronous operation counted from the SYNC command, judges that there is no relevance between the two synchronous operations. And, the second CPU 39, when judging that there is no relevance, stops the interpolation calculation of the robots and stops the control for the robots. Namely, the second CPU 39 becomes a checking means for preventing the control for the target synchronous operation of the target robot by the robot controlling means when judging that there is no relevance.

Therefore, the synchronous operations having no relevance among the synchronous operations of the robots can be respectively prevented from simultaneous execution and the robots can be prevented from execution of an undesired synchronous operation. Further, in this embodiment, the relevance is specified by the order of the synchronous operation after start of the synchronous period, though it may be specified by another condition.

Further, in this embodiment, in addition to the second CPU 39, the first CPU 32 also becomes a checking means. In this case, the first CPU 32, when judging that the operation of the robot generating the operation plan is a synchronous operation, checks for what number synchronous operation after execution of the SYNC command it is. And, the first CPU 32 gives the information indicating what number synchronous operation it is to the first CPUs 32 of the other controllers via the controller communication unit 37 and hub 25. And, the first CPU 32 judges whether the synchronous operation of the robot generating the operation plan among a plurality of synchronous operations of the target robot and the synchronous operation of another robot generating the operation plan simultaneously with generation of the operation plan among a plurality of synchronous operations of the other robots are the same in the order after execution of the SYNC command or not.

For example, when judging that when the second CPU 39 of the first robot generates the operation plan of the LMOVE a1 command which is the second synchronous operation counted from the SYNC command, the second CPU 39 of the second robot generates the operation plan of the LMOVE b2 command which is the third synchronous operation counted from the SYNC command, the second CPU 39 judges that there is no relevance between the two synchronous operations. And, when judging that there is no relevance, the second CPU 39 stops the generation of the operation plan of the robots and stops the control for the robots. Also in this case, the same effect as that when the control for the robots is stopped by the second CPU 39 can be obtained.

Figure 12:
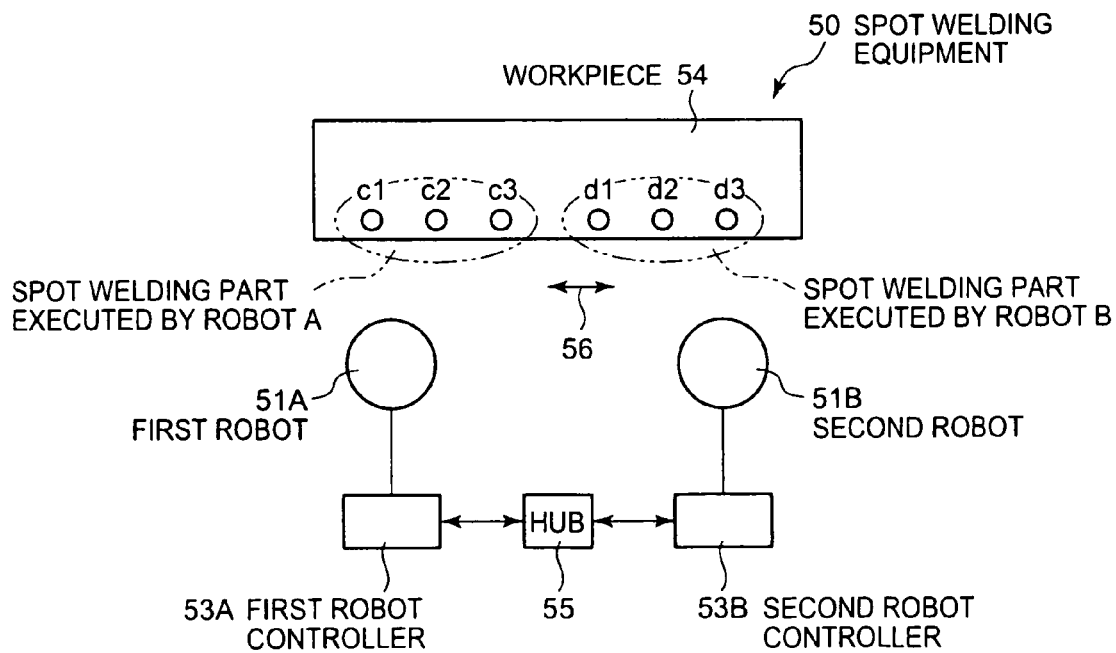
FIG. 12 is a drawing showing a spot welding equipment 50 of another embodiment of the present invention which is simplified.

FIG. 12 is a drawing showing spot welding equipment 50 of another embodiment of the present invention which is simplified. The spot welding equipment 50 of another embodiment performs spot welding at a plurality of welding parts c1 to c3 and d1 to d3 which are set on a workpiece 54 by a plurality of welding robots 51A and 51B. In this embodiment, the spot welding equipment 50 is structured so as to include the plurality of welding robots 51A and 51B, robot controllers 53A and 53B for controlling the robots 51A and 51B, and a hub 55 for connecting communicably the robot controllers 53A and 53B.

When the operation range of each of the robots 51 is small and the welding parts c1 to c3 and do to d3 are spread over a wide range, each of the robots 51 performs spot welding at the welding parts c1 to c3 and do to d3 close to itself. The welding parts c1 to c3 and d1 to d3 are set side by side in a predetermined first direction 56 and the robots are arranged side by side in the first direction, 56, thus the welding parts c1 to c3 close to the first robot among the welding parts c1 to c3 and d1 to d3 are welded by the first robot 51A. Further, the welding parts d1 to d3 close to the second robot among the welding parts c1 to c3 and d1 to d3 are welded by the second robot 51B.

Figure 13:
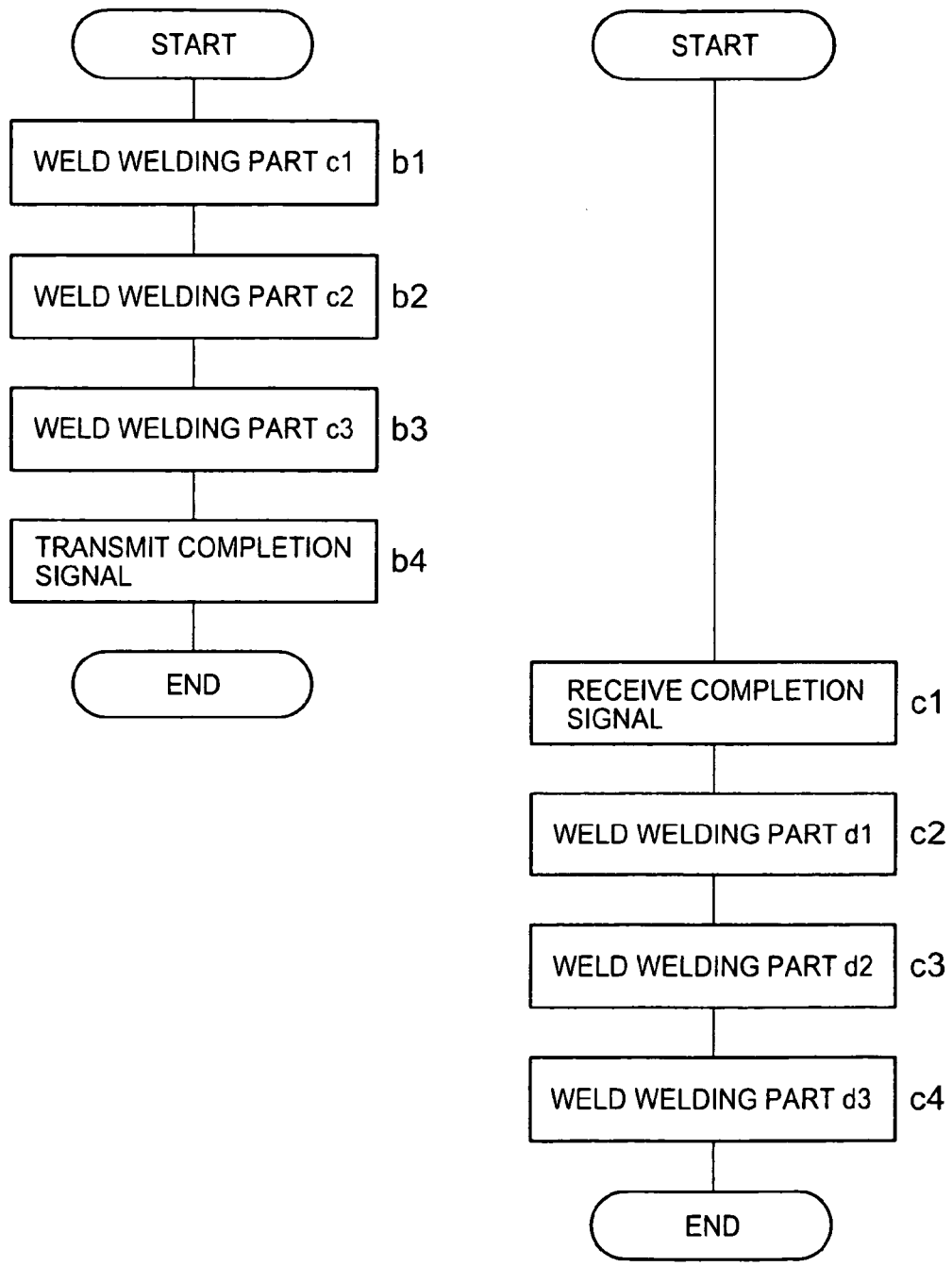
FIG. 13 is a flow chart showing an operation procedure of a controller of a comparison example.

FIG. 13 is a flow chart showing the operation procedure of each of the controllers 23 of the comparison example. When the robot 51A welds the welding part c3 close to the second robot, if the second robot 51B is intended to weld the welding part d1 close to the first robot, the robots or accessories loaded on the robots may interfere with each other. Therefore, after the first robot 51A welds the welding parts c1 to c3 in the neighborhood of the first robot 51, the second robot 51B welds the welding parts d1 to d3 in the neighborhood of the second robot 51.

In this case, the first controller 53A, when a welding start instruction is given, goes to Step b1 and starts the welding operation. At Steps b1 to b3, the first controller 53A gives an instruction to the first robot 51A to weld sequentially the welding parts c1 to c3. And, at Step b4, the first controller 53A, when judging that the first robot 51A completes welding at the welding parts to be welded, gives a completion signal to the second controller 53B and finishes the operation.

The second controller 53B, when the welding start instruction is given, goes to Step c1 and starts the welding operation. At Step c1, the second controller 53B waits for transmission of the completion signal from the first controller 53A and when the completion signal is given, goes to Step c2. At Steps c2 to c4, the second controller 53B gives an instruction to the second robot 51B to weld sequentially the welding parts d1 to d3. And, when judging that the second robot 51B completes welding at the welding parts to be welded, the second controller 53B finishes the operation. As mentioned above, the controllers 53 in the comparison example, to prevent interference of the first robot 51A and second robot 53B, when one robot 51 is in operation, stops the operation of the other robot 51. Therefore, the robots 51 cannot be operated simultaneously and the operation time by the robots 51 is prolonged.

Figure 14:
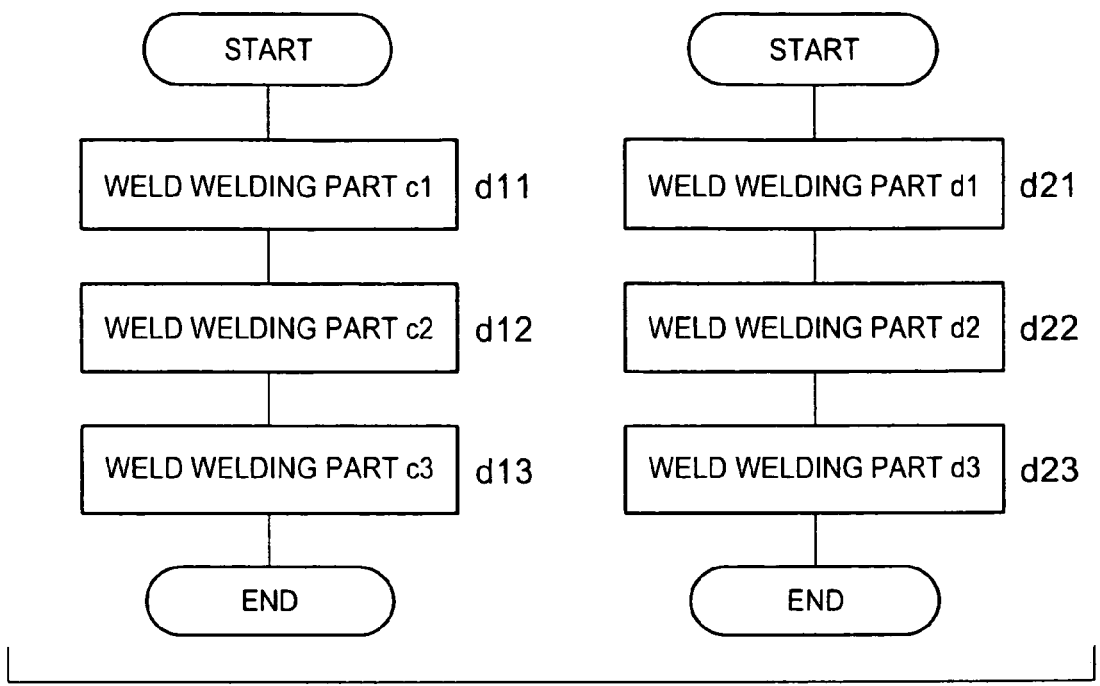
FIG. 14 is a flow chart showing an operation procedure of a controller 53 of the present invention.

FIG. 14 is a flow chart showing the operation procedure of the controllers 53 of the embodiment according to the present invention. In this embodiment, as mentioned above, the first robot 51A and second robot 51B can perform the synchronous operation free of interference. Concretely, when the first robot 51A welds the first welding part c1 of the first robot farthest from the second robot 51B, the second robot 51B welds the first welding part d1 of the second robot closest to the first robot 51A. Further, next, when the first robot 51A welds the second welding part c2 of the first robot secondly far from the second robot 51B, the second robot 51B welds the second welding part d2 of the second robot secondly close to the first robot 51A. Further, next, when the first robot 51A welds the third welding part c3 of the first robot closest to the second robot 51B, the second robot 51B welds the third welding part d3 of the second robot secondly farthest to the first robot 51A. To allow the robots 51A and 51B to operate like this, the controllers 53 control the robots 51.

In this embodiment, the controllers 53A and 53B are given a completion signal indicating completion of the welding from the welding device. Reception of such a completion signal is included in the operation completion conditions. In spot welding, the welding completion time varies with variations in the thickness of two plates to be welded, the gap between the plates, and a teaching error. In this embodiment, as mentioned above, reception of the completion signal from the welding device is included in the operation completion conditions, so that even if the welding completion time is varied between the robots, the start timing of the next operations can be made equal and the synchronous operation of each robot can be performed stably.

Concretely, the controllers 53A and 53B, when a welding start instruction is given, go to Step d11, d21 and start simultaneously the welding operation. At Steps d11 to d13 and d21 to d23, the controllers 53A and 53B give an instruction so as to sequentially weld the welding parts (c1, d1), (c2, d2), and (c3, d3) by the corresponding robots. At this time, as mentioned above, the controllers 53A and 53B can reduce time lags in the time of arrival at the first welding part c1 of the first robot and the first welding part d1 of the second robot, the time of arrival at the second welding part c2 of the first robot and the second welding part d2 of the second robot, and the time of arrival at the third welding part c3 of the first robot and the third welding part d3 of the second robot. By doing this, the robots are prevented from interference, and the welding operations by the two robots 51 can be performed simultaneously, and the operation time can be shortened. Further, in this embodiment, as mentioned above, when the welding by the first robot and second robot is completed, the robots move to the next operations, so that even if the welding completion time is varied, the synchronous operations can be performed precisely.

Figure 15:
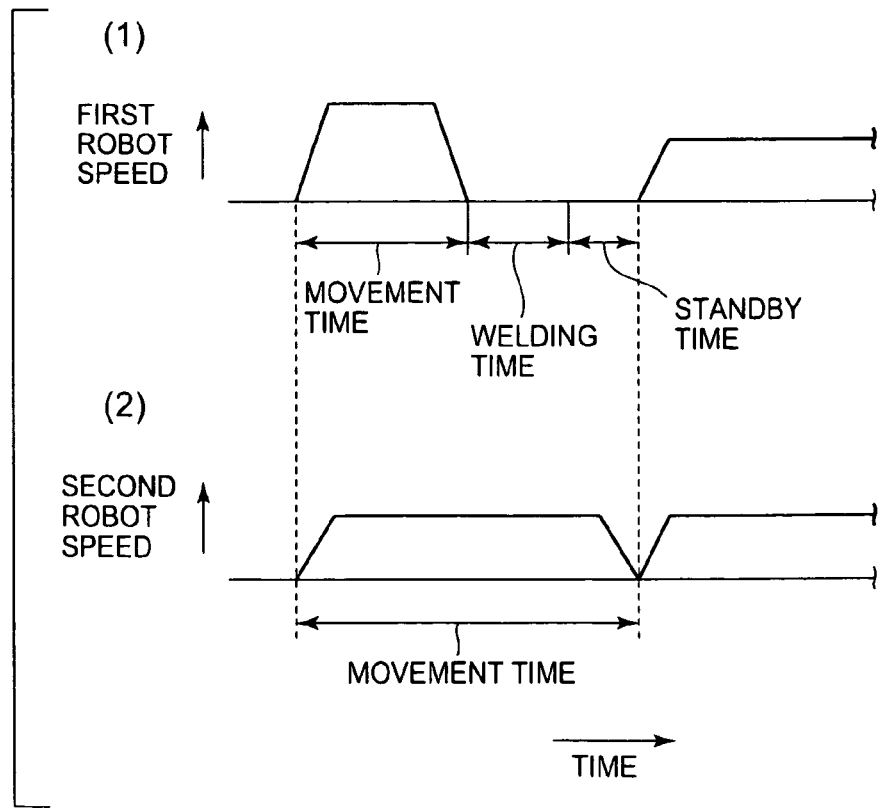
FIG. 15 includes graphs for explaining a case that a first robot 51A performs welding at the synchronous operation position and then the first robot 51A and a second robot 51B move simultaneously from the synchronous operation positions.
Figure 16:
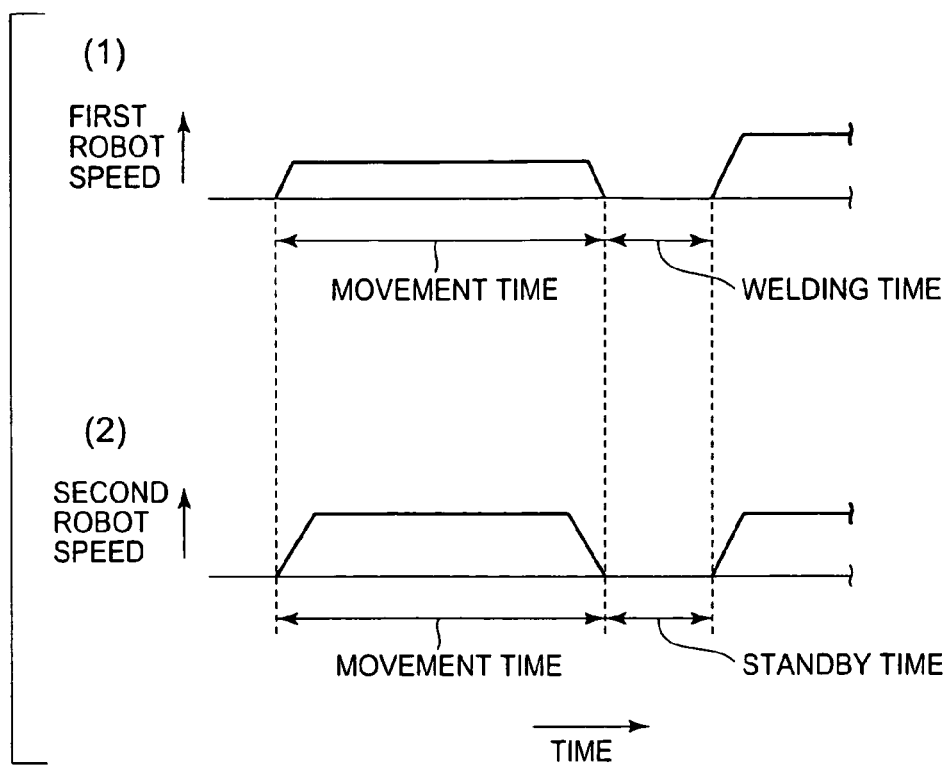
FIG. 16 includes graphs for explaining a case that the first robot 51A performs welding at the synchronous operation position and then the first robot 51A and second robot 51B move simultaneously from the synchronous operation positions.
Figure 17:
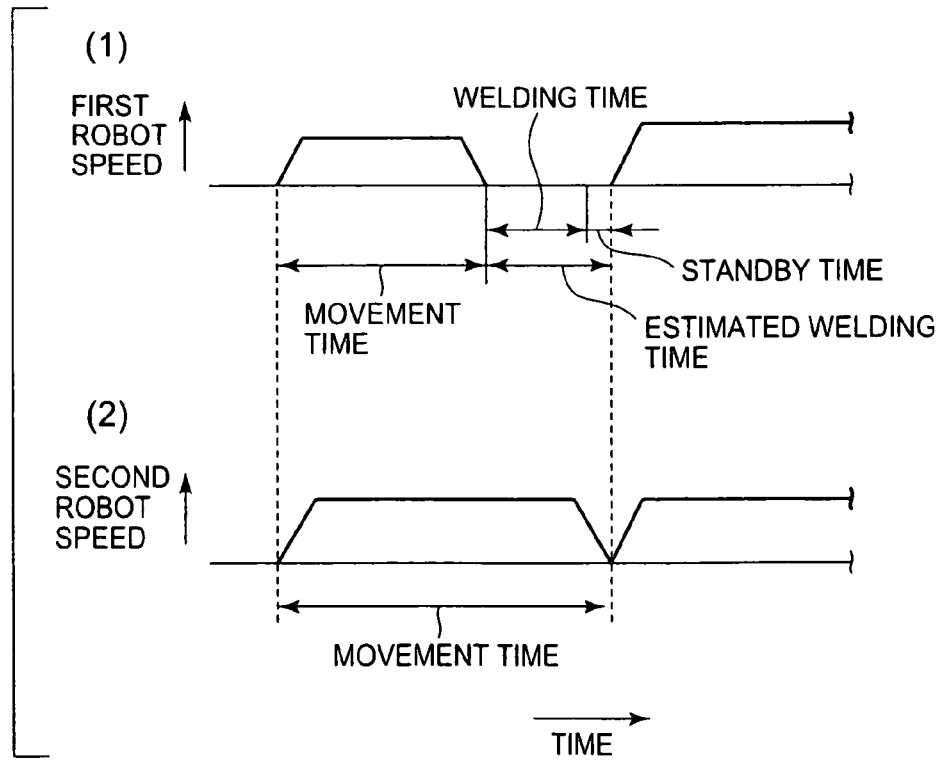
FIG. 17 includes graphs for explaining a case that the first robot 51A performs welding at the synchronous operation position and then the first robot 51A and second robot 51B move simultaneously from the synchronous operation positions.

Further, in this embodiment, among the two robots performing the synchronous operation, it is possible to perform welding by one robot and move the hand by another robot. FIGS. 15 to 17 are graphs for explaining a case that the first robot 51A performs welding at the synchronous position and then the first robot 51A and second robot 51B move simultaneously from the synchronous operation positions. FIGS. 15 to 17 show a case that the first movement time of the second robot 51B is longer than the first movement time of the first robot 51A.

FIG. 15 includes graphs showing the first comparison example. Further, FIG. 16 includes graphs showing the second comparison example. Further, FIG. 17 includes graphs of the embodiment of the present invention. FIGS. 15(1), 16(1), and 17(1) show a change with time of the first robot 51A and FIGS. 15(2), 16(2), and 17(2) show a change with time of the second robot 51B.

In the first comparison example shown in FIG. 15, the robots 15A and 15B are different in the arrival time at the synchronous operation position. The first robot 51A reaches the synchronous operation position, then instructs start of welding, and stands by in the state of completion of welding. And, when the second robot 51B reaches the synchronous operation position, the robots 51A and 51B simultaneously move to the next positions. In this case, similarly to the conventional art, for the first robot 51A, the standby time of waiting for movement from the synchronous operation position after end of welding is generated. As mentioned above, the first robot 51A moves to the synchronous operation position at its maximum speed, performs welding, and then stands by, so that the energy efficiency is low.

In the second comparison example shown in FIG. 16, the arrival time at the synchronous operation position of the first robot 51A is made equal to that of the second robot 51B. The first robot 51A starts welding after arrival at the synchronous operation position. The second robot 51B stands by for completion of the welding by the first robot 51A. And, when the welding by the first robot 51A is completed, the robots 51A and 51B move simultaneously to the next positions. In this case, after the second robot 51B reaches the synchronous operation position, the first robot 51A starts welding. And, the second robot 51B, when the welding time elapses after arrival at the synchronous operation position, moves to the next position, thus the cycle time of the robot 51A is increased.

In the embodiment of the present invention shown in FIG. 17, the movement time of the first robot 51A is set so as to make the total operation time of the movement time of the first robot 51A to the synchronous operation position and the estimated welding time until completion of welding equal to the movement time of the second robot 51B. In this embodiment, the estimated welding time is set to a maximum welding time among the welding time from start of welding to completion of welding. Therefore, the moving speed of each robot is adjusted so as to make the time from operation start at the operation start position to completion of the preparation for simultaneous execution of the operation of each robot at the synchronous operation position almost equal.

The first robot 51A reaches the synchronous operation position at the time earlier than the time of movement of the second robot 51B to the synchronous operation position by the estimated welding time. And, the first robot 51A starts welding after arrival at the synchronous operation position. And, the time when the estimated welding time elapses from arrival at the synchronous operation position and the time of movement of the second robot 51B to the synchronous operation position coincide with each other. Therefore, the standby time of the first robot can be made as smaller as possible, and the energy efficiency of the first robot 51A can be improved, and the cycle time can be prevented from increasing.

Figure 18:
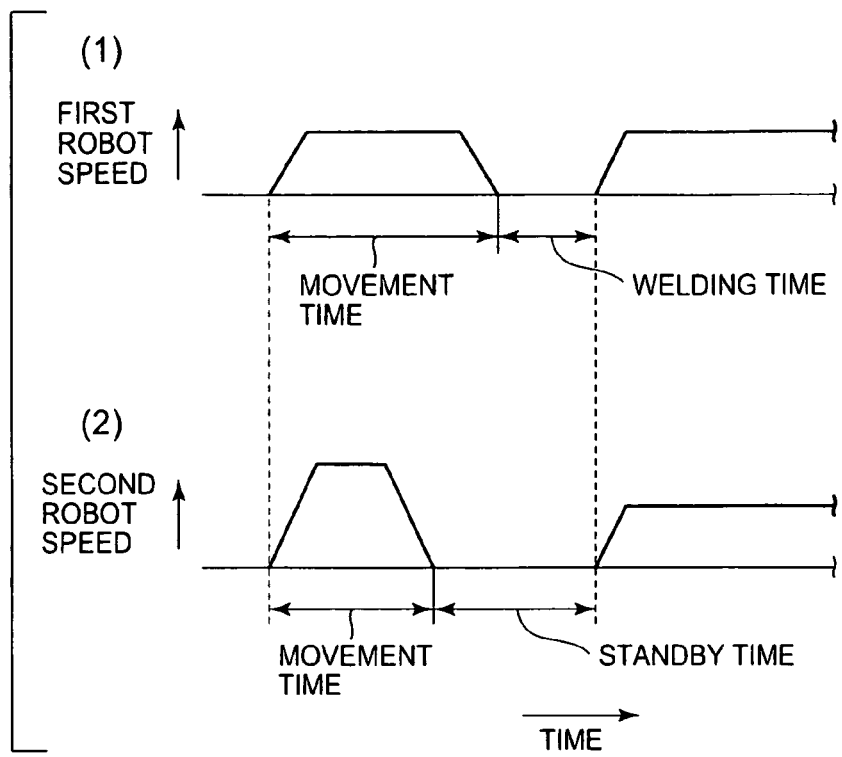
FIG. 18 includes graphs for explaining a case that the first robot 51A performs welding at the synchronous operation position and then the first robot 51A and second robot 51B move simultaneously from the synchronous operation positions.
Figure 19:
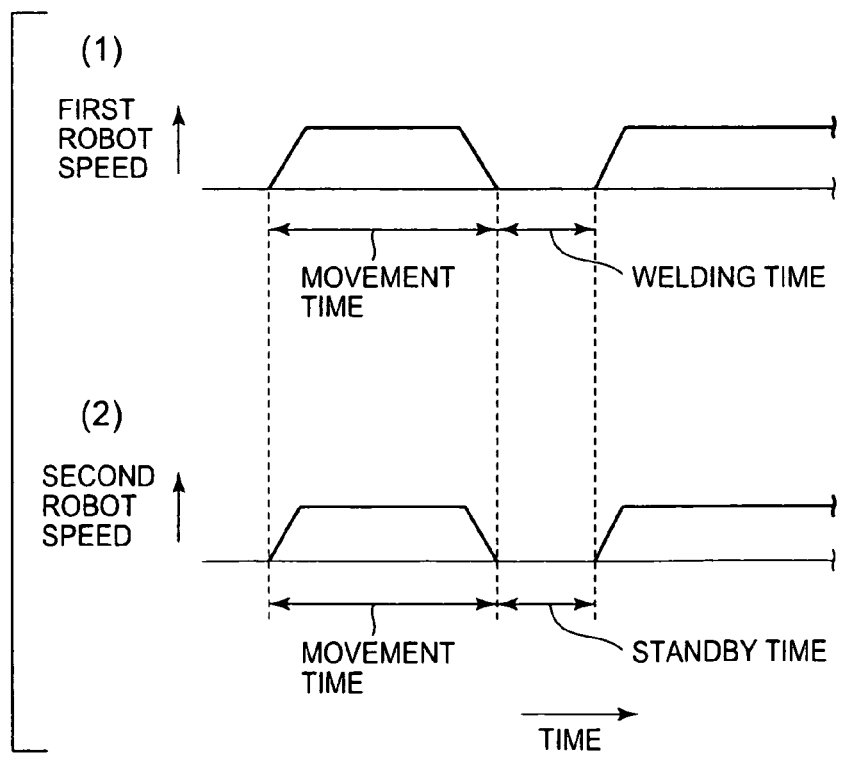
FIG. 19 includes graphs for explaining a case that the first robot 51A performs welding at the synchronous operation position and then the first robot 51A and second robot 51B move simultaneously from the synchronous operation positions.
Figure 20:
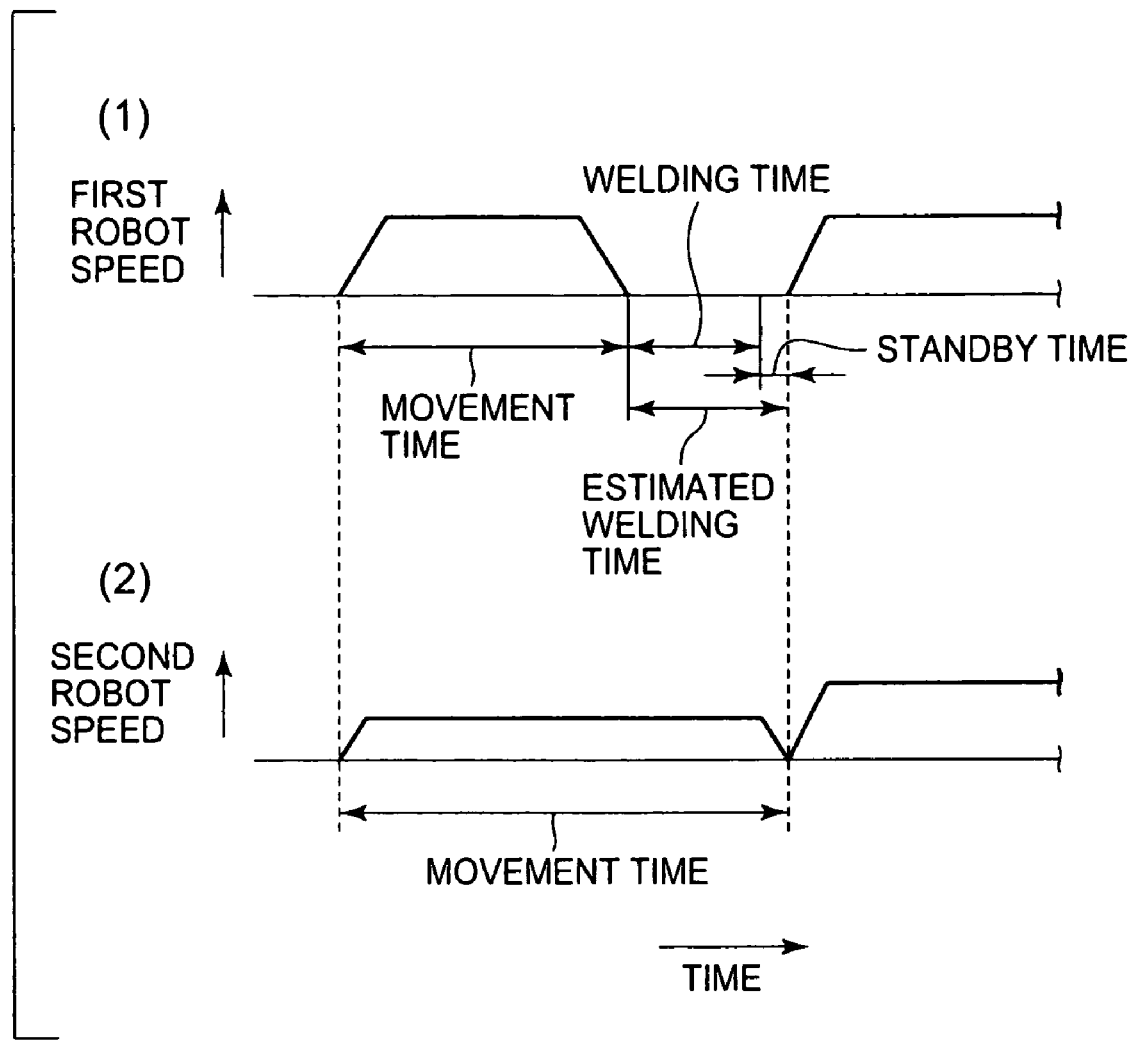
FIG. 20 includes graphs for explaining a case that the first robot 51A performs welding at the synchronous operation position and then the first robot 51A and second robot 51B move simultaneously from the synchronous operation positions.

FIGS. 18 to 20 are graphs for explaining a case that the first robot 51A performs welding at the synchronous position and then the first robot 51A and second robot 51B move simultaneously from the synchronous operation positions. FIGS. 18 to 20 show a case that the first movement time of the first robot 51A is longer than the second movement time of the second robot 51B.

FIG. 18 includes graphs showing the first comparison example. Further, FIG. 19 includes graphs showing the second comparison example. Further, FIG. 20 includes graphs of the embodiment of the present invention. FIGS. 18(1), 19(1), and 20(1) show a change with time of the first robot 51A and FIGS. 18(2), 19(2), and 20(2) show a change with time of the second robot 51B.

In the first comparison example shown in FIG. 18, the robots 15A and 15B are different in the arrival time at the synchronous operation position. The second robot 51B operates at its minimum speed, thereby reaches the synchronous operation position, and stands by for completion of welding. And, when the second robot 51A reaches the synchronous operation position and completes welding at the synchronous operation position, the robots 51A and 51B simultaneously move to the next positions. In this case, similarly to the conventional art, for the second robot 51B, the standby time of waiting for starting of the next movement after reaching the synchronous operation position is generated. As mentioned above, the second robot 51B moves to the synchronous operation position at its maximum speed and then stands by for completion of the welding by the first robot, so that the energy efficiency is low.

In the second comparison example shown in FIG. 19, the arrival time at the synchronous operation position of the first robot 51A is made equal to that of the second robot 51B. The second robot 51B stands by for completion of the welding by the first robot 51A. And, when the welding by the first robot 51A is completed, the robots 51A and 51B move simultaneously to the next positions. Also in this case, the second robot 51B moves to the synchronous operation position at its maximum speed and then stands by for completion of the welding by the first robot, so that the energy efficiency is low.

In the embodiment of the present invention shown in FIG. 20, estimated operation time is set, and so as to make the total operation time of the movement time of the first robot 51A to the synchronous operation position and the estimated welding time until completion of welding equal to the movement time of the second robot 51B, the movement time of the first robot 51A is set. Therefore, the moving speed of each robot is adjusted so as to make the time from operation start at the operation start position to completion of the preparation for simultaneous execution of the operation of each robot at the synchronous operation position almost equal.

The second robot 51B reaches the synchronous operation position at the time later than the time of movement of the first robot 51A to the synchronous operation position by the estimated welding time. Therefore, the standby time of the second robot 51B can be removed and the standby time of the first robot can be made as small as possible, and the energy efficiency of the first robot 51A can be improved, and the cycle time can be prevented from increasing. As mentioned above, when the first movement time of each of the robots 51 is set so as to include the arrival time when the welding device starts movement from the movement start position and moves to the synchronous operation position and the estimated welding time executed at the synchronous operation position, even if an independent operation such as welding is performed at the synchronous operation position, the cycle time can be prevented from increasing.

Here, the robots 51, as an independent operation to be performed at the synchronous operation position, may perform an independent operation other than welding. In this case, the first movement time of each robot includes the arrival time aforementioned and the estimated time of the independent operation time required for the independent operation to be performed by the robot hand at the synchronous operation position before performing the synchronous operation together with another robot.

As shown in FIGS. 15 to 17, when the first robot 51A performing the independent operation and the second robot 51B not performing the independent operation simultaneously perform the operations at the simultaneous operation positions and the first movement time of the second robot 51B is longer than the first movement time of the first robot 51A, at the time when the second robot 51B reaches the simultaneous operation position, the independent operation of the first robot 51A is completed. Therefore, the robots 51 can simultaneously perform the operations at the simultaneous operation positions without waiting at the simultaneous operation positions. Further, the energy consumption of the first robot 51A can be suppressed.

Further, as shown in FIGS. 18 to 20, when the first robot 51A performing the independent operation and the second robot 51B not performing the independent operation simultaneously perform the operations at the simultaneous operation positions and the first movement time of the first robot 51A is longer than the first movement time of the second robot 51B, at the time when the first robot 51A finishes the independent operation, the second robot 51B reaches the simultaneous operation position. Therefore, the robots can simultaneously perform the operations at the simultaneous operation positions without waiting at the simultaneous operation positions. Further, the energy consumption of the second robot 51B can be suppressed. Further, in this embodiment, the estimated welding time is set to estimated maximum welding time until completion of welding. On the other hand, as another embodiment, the estimated welding time may be set to mean welding time or may be set to shortest welding time.

Figure 21:
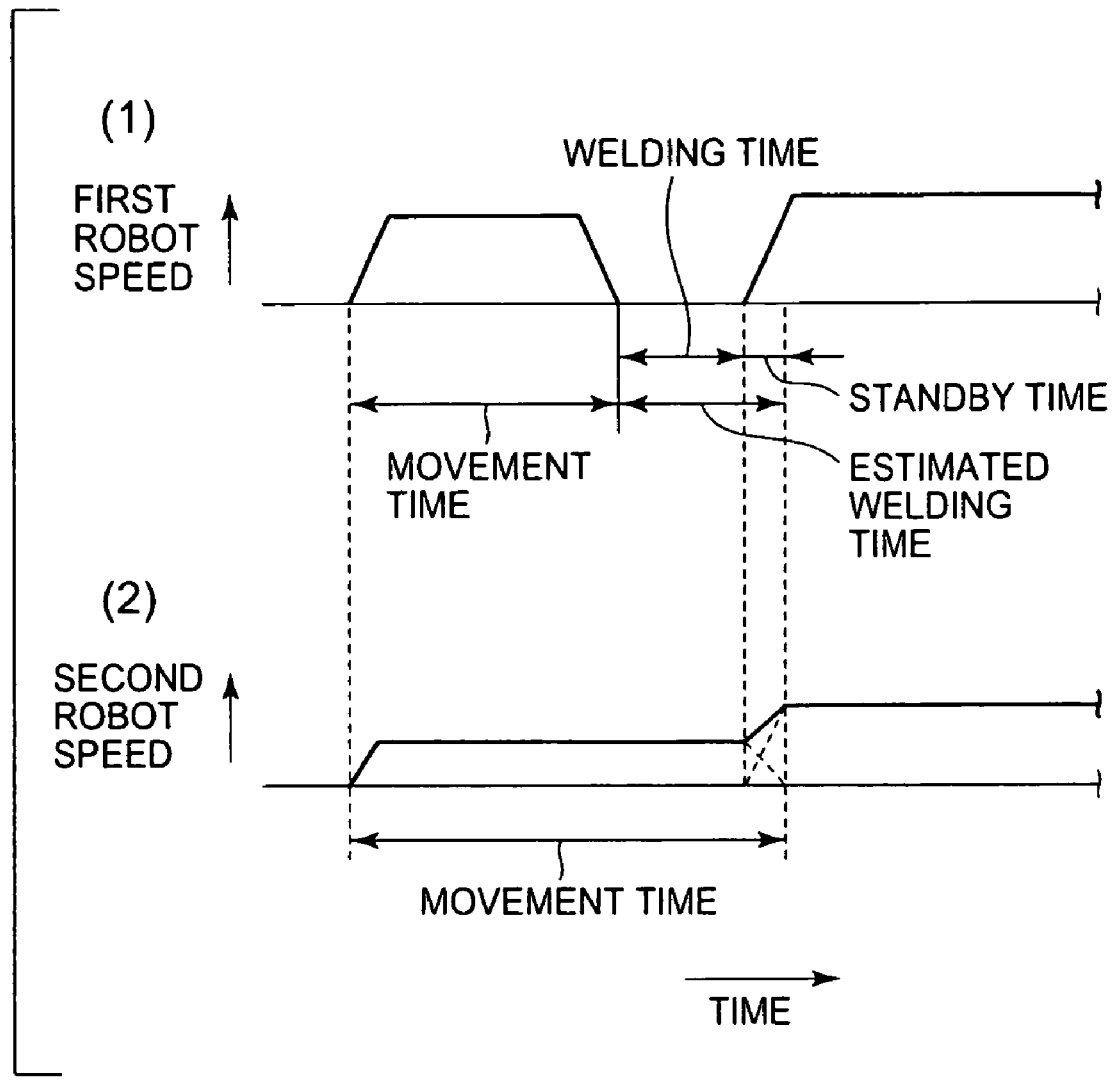
FIG. 21 includes graphs showing a case that an accuracy range is set in the second robot.

FIG. 21 includes graphs showing a case that an accuracy range is set in the second robot. In this embodiment, for the first robot, the estimated welding time is set to estimated maximum welding time until completion of welding. When an accuracy range is set in the second robot, the hand of the second robot, before the estimated welding time elapses after the first robot reaches the synchronous operation position, completes the preparation of starting the next operation.

The first robot controller, upon receipt of a welding completion signal from the welding device, gives information of the operation completion state to the other controllers. Therefore, when the welding is completed at the time earlier than the estimated welding time, the second robot hand can start the next operation without stopping perfectly, and the second robot is further prevented from a reduction in speed, and the energy efficiency can be improved more.

Figure 22:
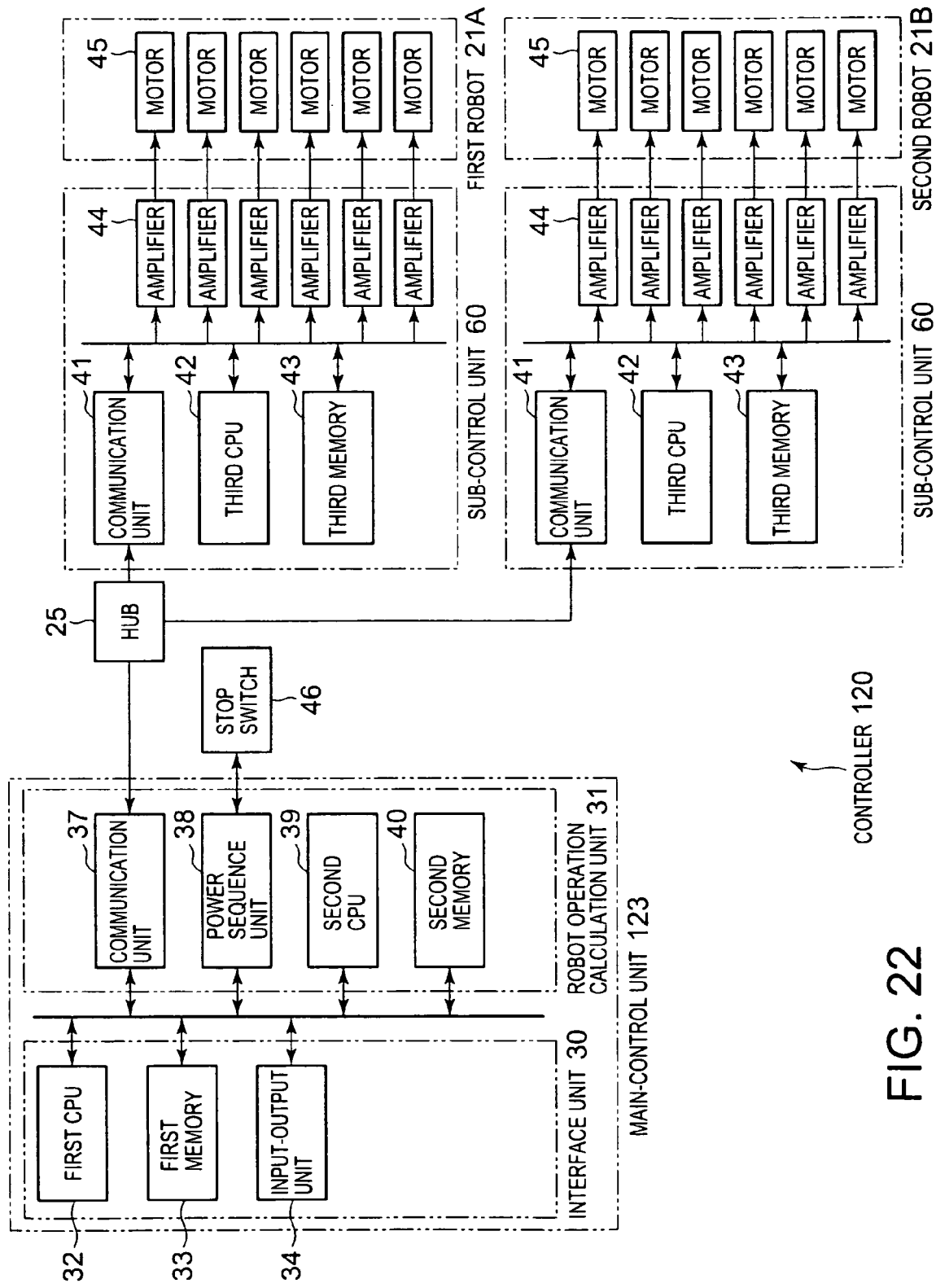
FIG. 22 is a drawing showing the functional constitution of a controller 120 of still another embodiment of the present invention.
Figure 23:
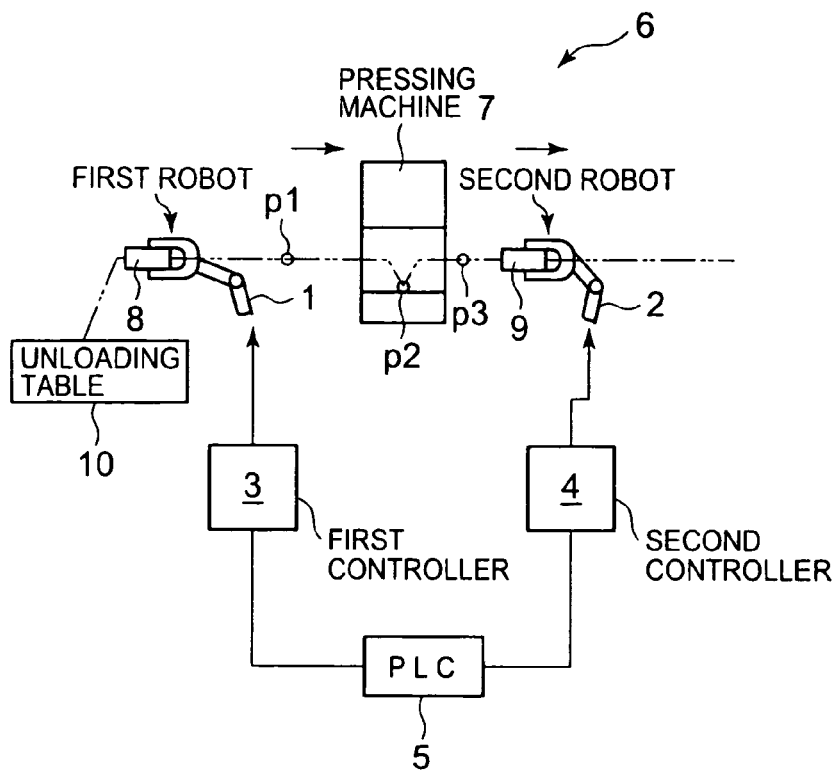
FIG. 23 is a drawing for explaining a pressing equipment 6 of the related art.
Figure 24:
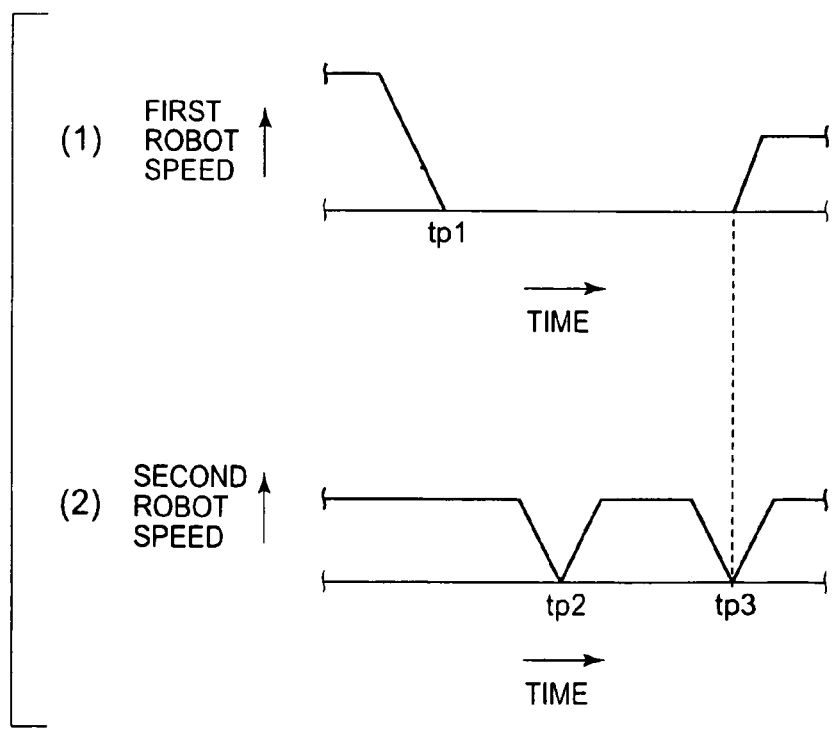
FIG. 24 includes graphs showing a change with time of the speed of each of workpieces 8 and 9 of robots 1 and 2.

FIG. 22 is a drawing showing the functional constitution of the controller 120 of still another embodiment of the present invention. The controller 120 of this embodiment controls generally the robots 21. Therefore, independently of the number of robots 21, one controller is installed. Also in such a case, if the controller 120 has the functions performed by the first CPU 32, second CPU 39, and third CPU 42, as mentioned above, it can control the robots 21, requires no manual timing adjustment, and can operate simultaneously the robots 21.

In this embodiment, with respect to the first CPU 32 and second CPU 39, one of them is installed independently of the number of robots and the third CPU 42 is installed for each robot. Namely, the controller 120 includes a main control unit 123 and sub-control units 60 installed for each robot. Here, the main control unit 123 calculates the movement positions on the movement route where the robot hands 19 installed for each robot move. Further, each of the sub-control units 60, on the basis of the movement positions on the movement route of the robot hand of the corresponding robot, calculates and obtains the operation amount of each actuator for moving the robot hand of the corresponding robot on the movement route and controls each actuator of the robot by the operation amount. Also in such a case, the same effect as that of the robot controller 23 aforementioned can be obtained.

The embodiments aforementioned are just examples of the invention and the constitution thereof can be modified within the scope of the invention. For example, in the embodiments aforementioned, the robot controllers of the present invention are used for the pressing equipment and spot welding equipment. However, the present invention is not limited to such equipment and can be applied to equipment in which a plurality of robots operate simultaneously. For example, the present invention can be applied to painting equipment for painting workpieces by a plurality of robots and a transfer device for transferring workpieces by a plurality of robots. Further, the robots controlled by the controllers may be robots other than a six-axial vertical multi-joint robot.

Further, in the embodiments, the standard moving part of each robot is a robot hand, though it may be another part of the robot. Further, it may be another device mounted on the robot. Further, for the controller 23, the functions thereof are explained. However, any controller having similar functions is included in the present invention. For example, there is no need to separately use three CPUs and the robots may be controlled by one CPU. Further, each of the robot controllers 23 is connected communicably by a LAN cable. However, any communicable robot controllers are acceptable and robot controllers may be communicably connected to each other using another means such as an IO cable.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A robot controller that moves each standard moving part installed on each of a plurality of robots from each movement start position set for each of the robots to each synchronous operation position set for each of the robots and simultaneously performs operations of the robots, comprising:
first movement time calculating means for calculating, for each of the robots, first movement times tot1 and tot2 when moving each of the standard moving parts in a shortest time from the movement start positions to each of the synchronous operation positions;
second movement time deciding means for deciding a longest first movement time among the first movement times tot1 and tot2 calculated by the first movement time calculating means as a second movement time tot_max;
operation plan generating means for generating, for each of the robots, an operation plan of speed change of the standard moving parts for moving the standard moving parts, without stopping, from each of the movement start positions to each of the synchronous operation positions in the second movement time tot_max decided by the second movement time deciding means;
operation completion judging means for judging an operation completion condition in which the robot can execute a next operation plan; and
robot controlling means, when judging by the operation completion judging means that all of the robots to be simultaneously operated enter the operation completion condition, for simultaneously controlling each of the robots in accordance with next operation plans of each of the robots, which is generated by the operation plan generating means,
wherein the operation plan generating means, when the first movement times tot1 and tot2 of a target robot are shorter than the second movement time tot_max, generates the operation plan of speed change of the standard moving parts of the target robot so as to change acceleration times ta11 and ta21, deceleration times td11 and td21, times at uniform speed ts11 and ts21, and maximum moving speeds V11 and V21 of the standard moving parts in comparison to a case that the target robot moves in the first movement times tot1 and tot2 according to the following equations:

$ta11 = ta1 * tot\_max/tot1$, $ts11 = ts1 * tot\_max/tot1$, $td11 = td1 * tot\_max/tot1$, $V11 = V1 * tot1/tot\_max$, $ta21 = ta2 * tot\_max/tot2$, $ts21 = ts2 * tot\_max/tot2$, $td21 = td2 * tot\_max/tot2$, $V21 = V2 * tot2/tot\_max$, wherein ta1 and ta2 are acceleration times, td1 and td2 are deceleration times, ts1 and ts2 are times at uniform speed and V1 and V2 are maximum moving speeds for each robot, respectively, according to a case that the robot moves in the first movement times tot1 and tot2.

2. A robot controller according to claim 1, wherein the first movement time calculating means, the second movement time deciding means, the operation plan generating means, the operation completion judging means, and the robot controlling means are provided for each of the robots,
the robot controller further comprising communicating means for giving information of each first movement times tot1 and tot2 calculated by each first movement time calculating means to each second movement time deciding means and giving information indicating a shift to the operation completion condition judged by the operation completion judging means to each robot controlling means.

3. A robot controller according to claim 1, wherein the operation plan generating means is configured to generate each synchronous operation plan for moving each of the standard moving parts from each of the movement start positions to each of the synchronous operation positions in the second movement time tot_maxtot_max decided by the second movement time deciding means and the operation plan of speed change for moving each of the standard moving parts from a predetermined movement start position to a predetermined movement end position in the first movement times tot1 and tot2 calculated by the first movement time calculating means.

4. A robot controller according to claim 1, further comprising:
operation instructing means for instructing an operation stop of the robots,
wherein the robot controlling means, when judging that the operation stop instruction is given to a target robot by the operation instructing means, stops an operation of another robot which is simultaneously operated with the target robot from the synchronous operation position.

5. A robot controller according to claim 1, further comprising:
operation instructing means for instructing an operation restart of the robots,
wherein the robot controlling means, when judging that the operation restart instruction is given to a target robot by the operation instructing means, restarts an operation of another robot which is simultaneously operated with the target robot from the synchronous operation position.

6. A robot controller according to claim 1, wherein the first movement times tot1 and tot2 includes an arrival time required for the standard moving part to move from the movement start position to the synchronous operation position and an expected time of an independent operation time required for an independent operation to be performed by the standard moving part at the synchronous operation position before performing an operation simultaneously with another standard moving part.

7. A robot controller according to claim 1, further comprising inspecting means for judging, while continuously performing synchronous operations of each of the robots several times during a predetermined synchronous period, whether repetition times of execution of the synchronous operations of each of the robots which are taught beforehand are consistent with each other or not, and when judging that the repetition times of execution of the synchronous operations are not consistent with each other, for reporting that the repetition times of execution of the synchronous operations are not consistent with each other.

8. A robot controller according to claim 1, further comprising checking means for judging, while continuously performing synchronous operations of each of the robots several times during a predetermined synchronous period, whether a target synchronous operation of a target robot and the synchronous operation of another robot to be performed simultaneously with the target synchronous operation have relevance to each other or not, and when judging that there is no relevance, for interrupting the target synchronous operation of the target robot by the robot controlling means.

9. A robot controller according to claim 1, comprising a first CPU, a second CPU, a third CPU and a communication unit adapted to communicate with a hub; wherein the first CPU constitutes the first movement time calculating means, the second CPU constitutes the second movement time deciding means, the operation plan generating means and the operation completion judging means, and the third CPU constitutes the robot controlling means, and wherein the first, second and third CPU of the controller for one specific robot are interconnected with the respective first, second and third CPU of the controller for a different robot via the hub.

10. A robot control method for moving each standard moving part installed on each of a plurality of robots to each synchronous operation position set for each of the robots and simultaneously performing operations of the robots, comprising:

- a first movement time calculation step for calculating, for each of the robots, first movement times tot1 and tot2 when moving each of the standard moving parts in a shortest time from movement start positions to each of the synchronous operation positions;
- a second movement time decision step for deciding a longest first movement time among the first movement times tot1 and tot2 calculated at the first movement time calculation step as a second movement time tot_max;
- an operation plan generation step for generating, for each of the robots, an operation plan of speed change of the standard moving parts for moving the standard moving parts, without stopping, from each of the movement start positions to each of the synchronous operation positions, in the second movement time tot_max decided at the second movement time decision step;
- an operation completion judgment step for judging an operation completion condition in which the robot can execute a next operation plan; and
- a robot control step, when judging at the operation completion judgment step that all of the robots to be simultaneously operated enter the operation completion condition, for simultaneously controlling each of the robots in accordance with next operation plans of each of the robots, which is generated at the operation plan generation step, wherein in the operation plan generation step, when the first movement times tot1 and tot2 of a target robot are shorter than the second movement time tot_max, the operation plan of speed change of the standard moving part of the target robot is generated so as to change acceleration times ta11 and ta21, deceleration times td11 and td21, times at uniform speed ts11 and ts21, and maximum moving speeds V11 and V21 of the standard moving part in comparison to a case that the target robot moves in the first movement times tot1 and tot2 according to the following equations:

$$ta11 = ta1 * tot\_max/tot1,$$

$$ts11 = ts1 * tot\_max/tot1,$$

$$td11 = td1 * tot\_max/tot1,$$

$$V11 = V1 * tot1/tot\_max,$$

$$ta21 = ta2 * tot\_max/tot2,$$

$$ts21 = ts2 * tot\_max/tot2,$$

$$td21 = td2 * tot\_max/tot2,$$

$$V21 = V2 * tot2/tot\_max,$$

wherein ta1 and ta2 are acceleration times, td1 and td2 are deceleration times, ts1 and ts2 are times at uniform speed and V1 and V2 are maximum moving speeds for each robot, respectively, according to a case that the robot moves in the first movement times tot1 and tot2.

* * * * *